(12) United States Patent
Mori et al.

(10) Patent No.: US 7,483,713 B2
(45) Date of Patent: Jan. 27, 2009

(54) BASE STATION AND TRANSMISSION POWER CONTROL METHOD

(75) Inventors: Shinichi Mori, Yokosuka (JP); Ichiro Okajima, Gyoda (JP); Narumi Umeda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 630 days.

(21) Appl. No.: 11/263,923

(22) Filed: Nov. 2, 2005

(65) Prior Publication Data

US 2006/0111137 A1  May 25, 2006

(30) Foreign Application Priority Data

Nov. 5, 2004  (JP) .............................. 2004-322615

(51) Int. Cl.
    *H04B 7/00* (2006.01)
(52) U.S. Cl. .................... 455/522; 455/69; 455/436; 370/235; 370/329; 370/335; 370/441
(58) Field of Classification Search .................. 455/522
    See application file for complete search history.

(56) References Cited

U.S. PATENT DOCUMENTS

| | | | | |
|---|---|---|---|---|
| 4,096,440 | A * | 6/1978 | Okasaka ............... | 455/422.1 |
| 5,930,729 | A * | 7/1999 | Khamis et al. ........ | 455/571 |
| 6,252,865 | B1 * | 6/2001 | Walton et al. ........ | 370/335 |
| 6,442,152 | B1 * | 8/2002 | Park et al. ........... | 370/341 |
| 6,542,488 | B2 * | 4/2003 | Walton et al. ........ | 370/335 |
| 6,757,270 | B1 * | 6/2004 | Kumar et al. ........ | 370/342 |
| 6,826,408 | B1 * | 11/2004 | Kim et al. ........... | 455/466 |
| 6,873,645 | B2 * | 3/2005 | Lomp et al. .......... | 375/142 |
| 6,937,586 | B2 * | 8/2005 | Asokan .............. | 370/337 |
| 6,952,181 | B2 * | 10/2005 | Karr et al. .......... | 342/457 |
| 6,985,467 | B2 * | 1/2006 | Lomp et al. .......... | 370/335 |

(Continued)

FOREIGN PATENT DOCUMENTS

EP  1052791 A1 * 11/2000
EP  1081972 A2 * 3/2001

OTHER PUBLICATIONS

Takahiro Hayashi, et al., "A Study of Transmission Power Allocation in Downlink Common Control Channels in W-CDMA System", IEICE General Conference 2000, B-5-81, Mar. 2000, p. 466 (with partial English translation).

(Continued)

*Primary Examiner*—Matthew D. Anderson
*Assistant Examiner*—Hai V Nguyen
(74) *Attorney, Agent, or Firm*—Oblon, Spivak, McClelland, Maier & Neustadt, P.C.

(57) ABSTRACT

A base station is disclosed. The base station includes: a service area status determination unit configured to determine status of a service area of the base station based on received signals from mobile stations; a total transmission power determination unit configured to determine status of total transmission power of the base station based on total transmission power of surrounding base stations; a transmission power determination unit configured to determine transmission power of a common control channel of the base station based on the status of the service area and the status of the total transmission power; and a transmission power setting unit configured to set the transmission power determined by the transmission power determination unit.

9 Claims, 21 Drawing Sheets

U.S. PATENT DOCUMENTS

| | | | |
|---|---|---|---|
| 7,142,548 B2 * | 11/2006 | Fong et al. | 370/395.4 |
| 7,149,530 B1 * | 12/2006 | Arakawa et al. | 455/456.1 |
| 7,158,504 B2 * | 1/2007 | Kadaba et al. | 370/348 |
| 7,184,447 B1 * | 2/2007 | Koo et al. | 370/441 |
| 7,218,891 B2 * | 5/2007 | Periyalwar et al. | 455/13.1 |
| 7,245,914 B2 * | 7/2007 | Ishikawa | 455/436 |
| 7,349,703 B2 * | 3/2008 | Yi et al. | 455/452.2 |
| 7,372,842 B2 * | 5/2008 | Kim et al. | 370/345 |
| 2001/0028638 A1 * | 10/2001 | Walton et al. | 370/335 |
| 2001/0046872 A1 * | 11/2001 | Masuda | 455/502 |
| 2002/0022482 A1 * | 2/2002 | Ishikawa | 455/434 |
| 2003/0048764 A1 * | 3/2003 | Diep et al. | 370/335 |
| 2003/0108027 A1 * | 6/2003 | Kim et al. | 370/345 |
| 2004/0090934 A1 * | 5/2004 | Cha et al. | 370/329 |
| 2004/0192204 A1 * | 9/2004 | Periyalwar et al. | 455/25 |
| 2004/0229629 A1 * | 11/2004 | Yi et al. | 455/452.2 |
| 2005/0047344 A1 * | 3/2005 | Seol | 370/235 |
| 2005/0249148 A1 * | 11/2005 | Nakamata et al. | 370/328 |
| 2005/0277429 A1 * | 12/2005 | Laroia et al. | 455/458 |
| 2006/0034239 A1 * | 2/2006 | Abeta et al. | 370/341 |
| 2006/0040691 A1 * | 2/2006 | Diep et al. | 455/518 |
| 2007/0105548 A1 * | 5/2007 | Mohan et al. | 455/426.1 |
| 2007/0165667 A1 * | 7/2007 | Kadaba et al. | 370/465 |
| 2008/0101257 A1 * | 5/2008 | Cheng et al. | 370/252 |
| 2008/0108368 A1 * | 5/2008 | Yi et al. | 455/452.2 |

OTHER PUBLICATIONS

Shinichi Mori, et al., "Field Experiments for Service Area Evaluation in W-CDMA with Receiving Quality Measurement Systems", IEICE General Conference 2000, B-5-34, Mar. 2001, p. 432 (with partial English translation).

Masayuki Motegi, et al., "Autonomous Distributed Cell Planning Using Neighboring Base Station Information for CDMA Cellular Systems", IEICE Society Conference, B-5-105, Sep. 2003, 1 page (with partial English translation).

* cited by examiner

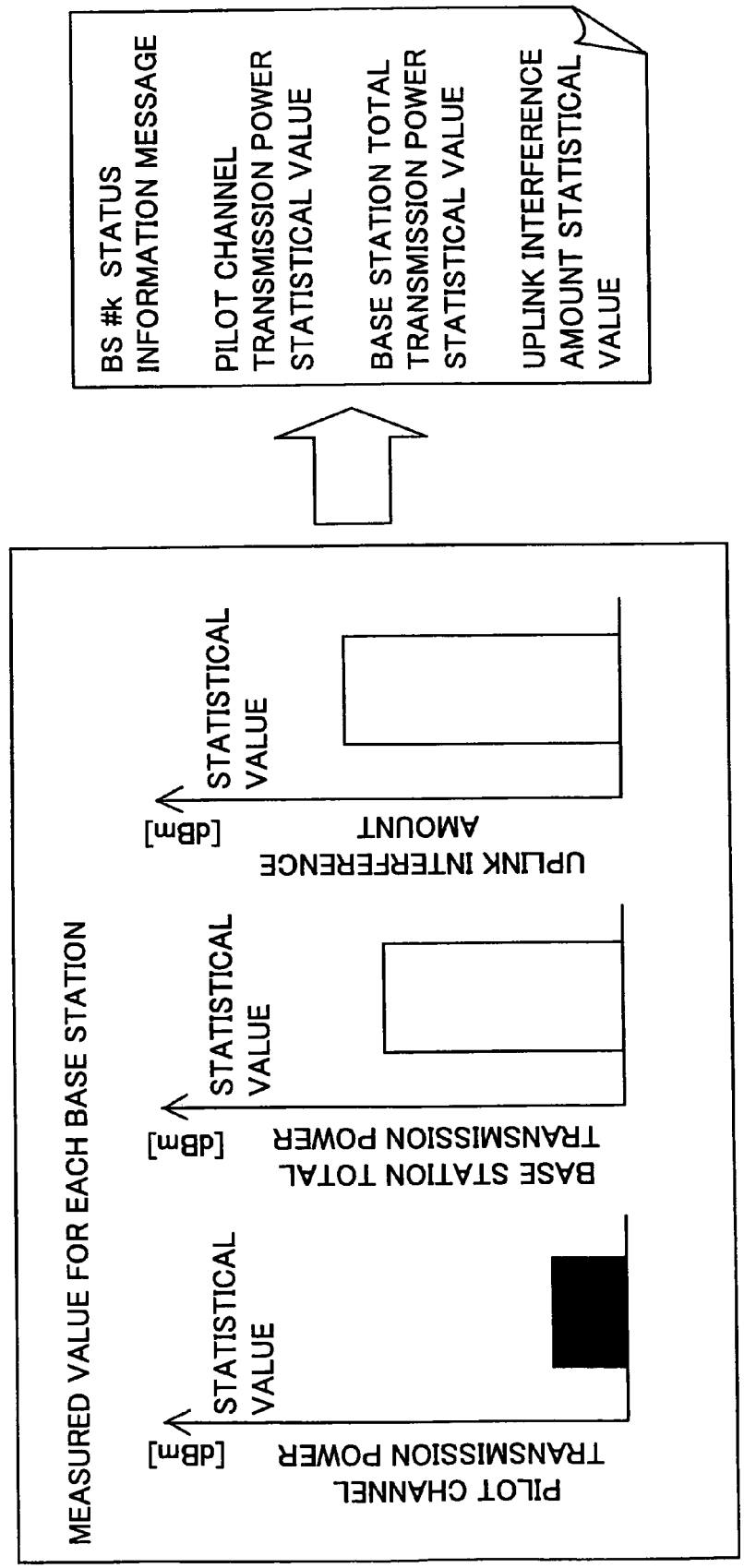

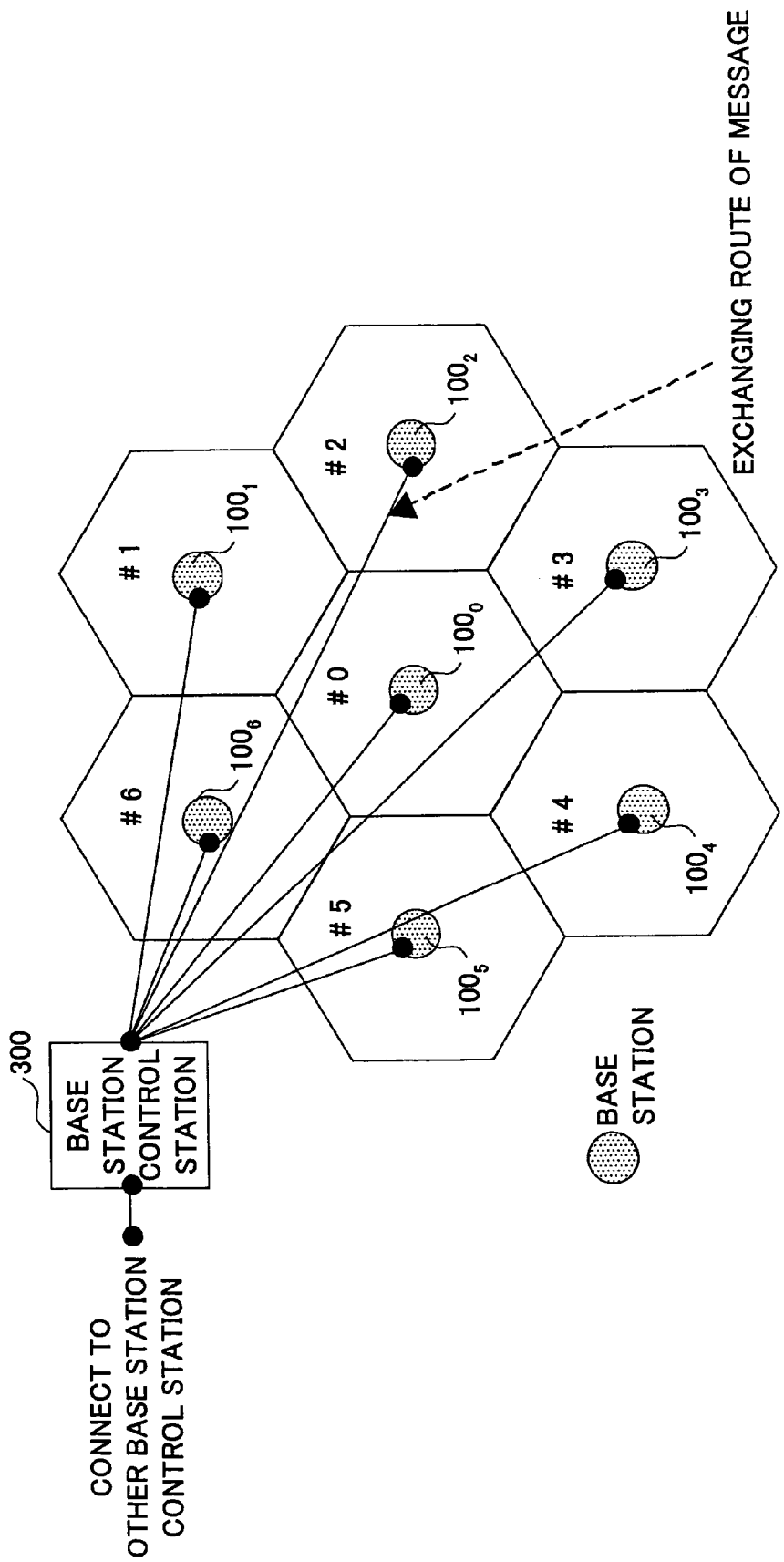

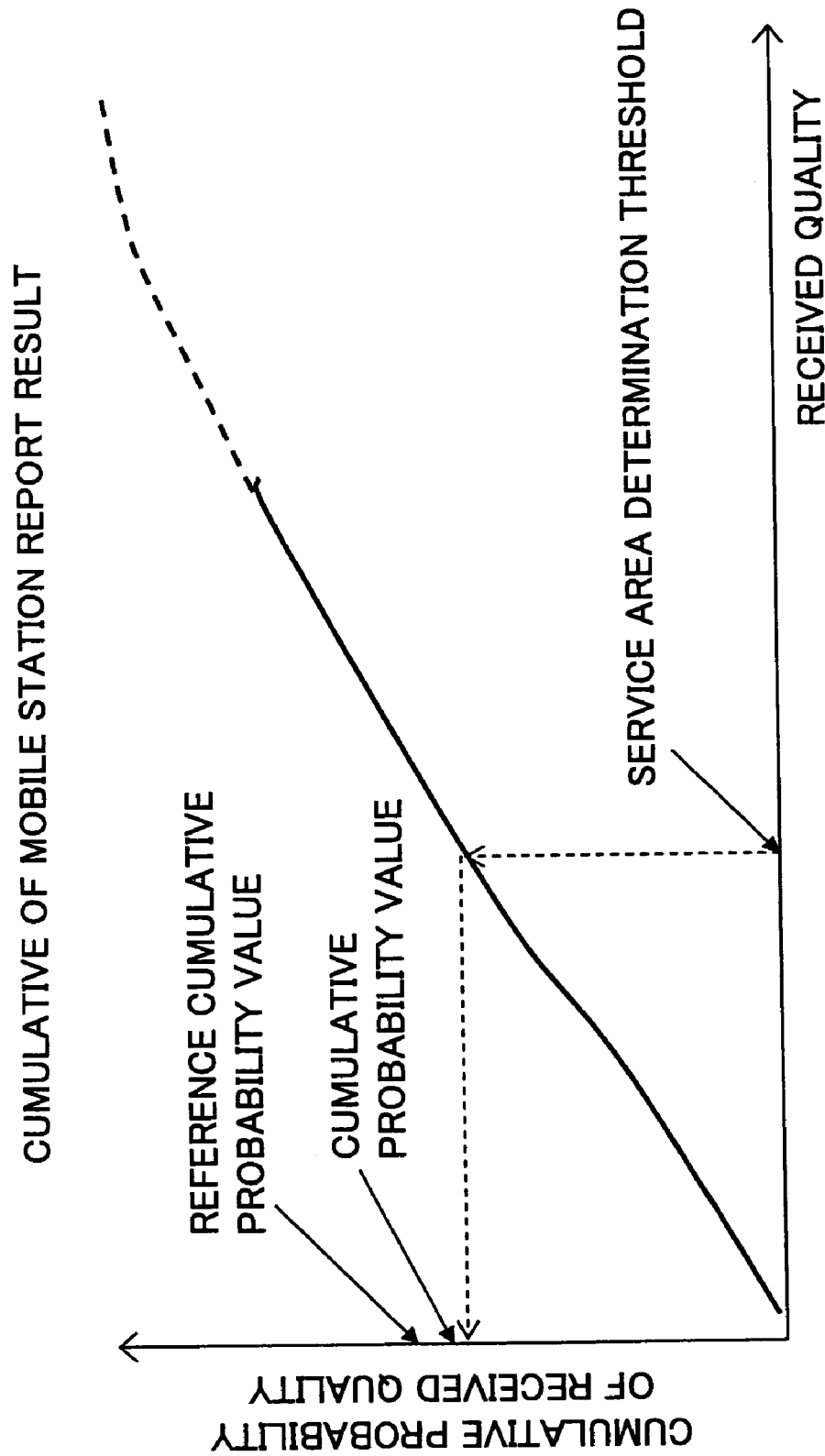

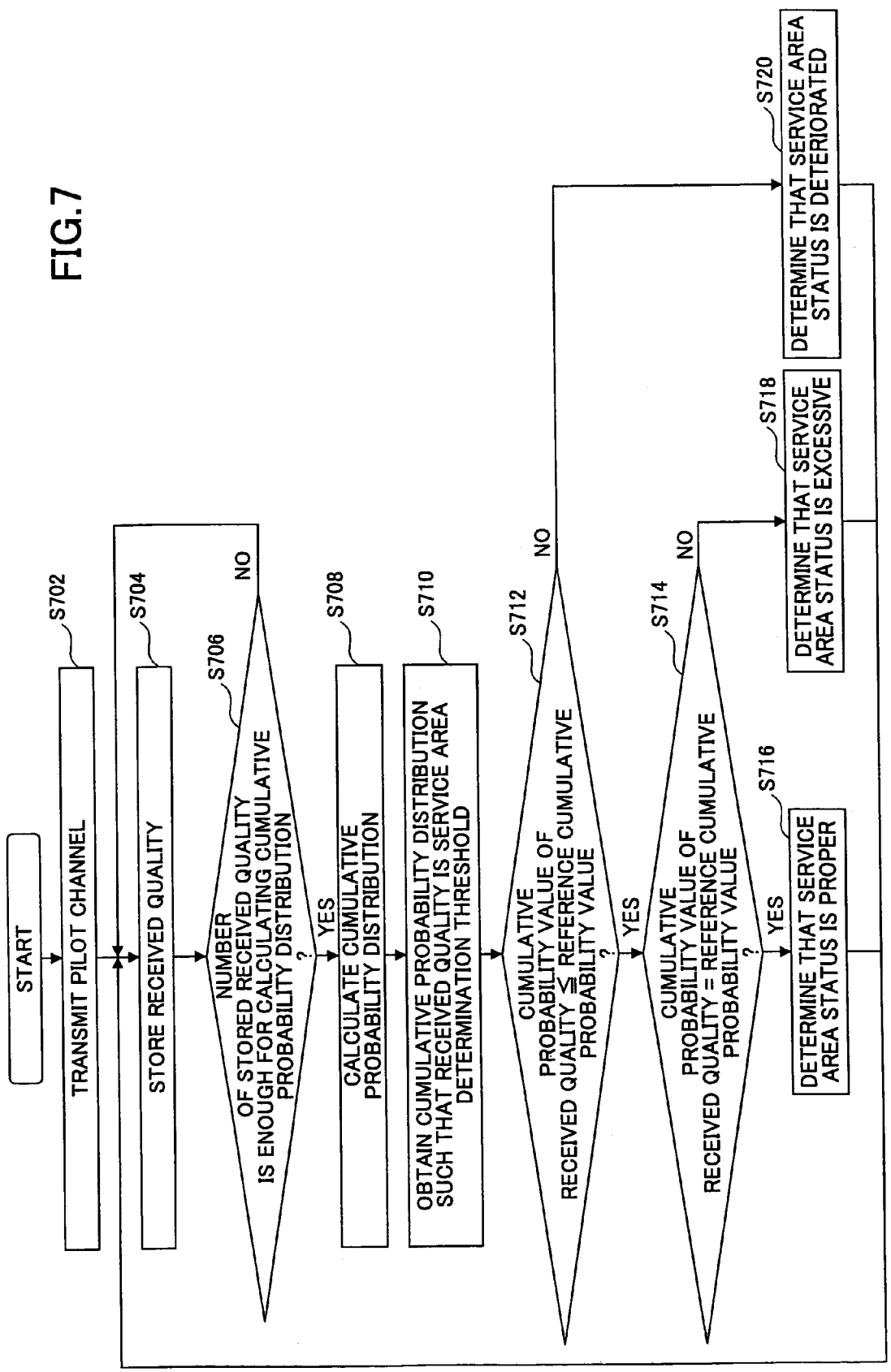

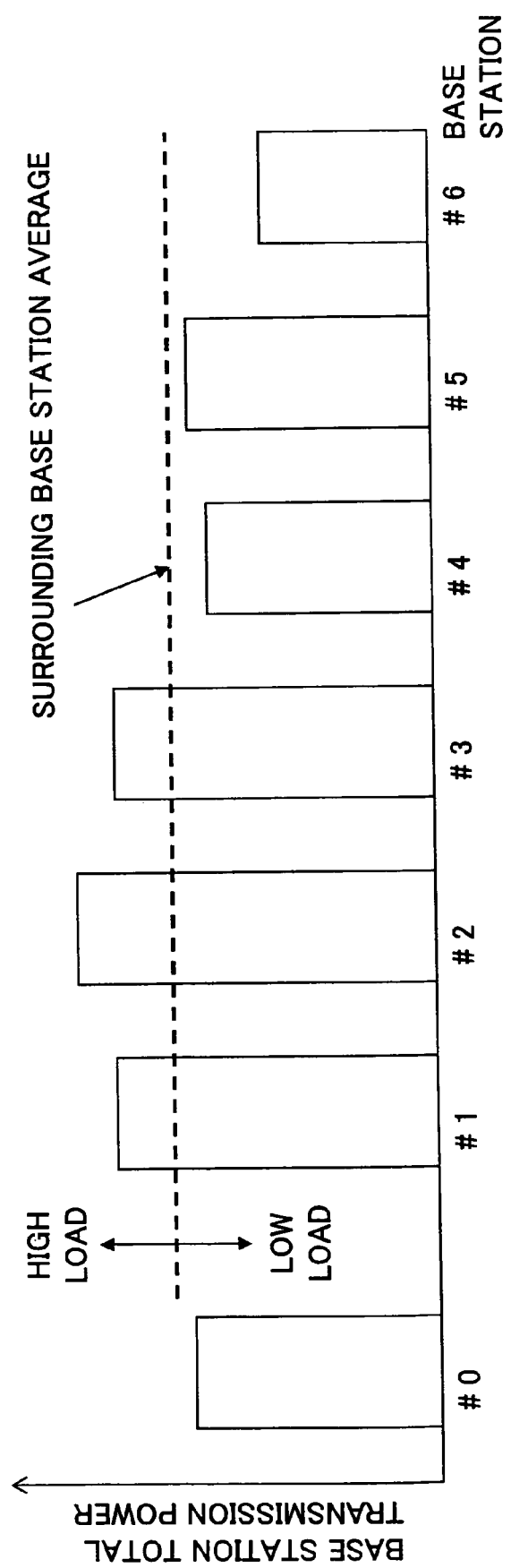

FIG.10

TOTAL TRANSMISSION POWER ≥ PREDETERMINED VALUE

| | SERVICE AREA | COMMON CONTROL CHANNEL TRANSMISSION POWER + UPLINK INTERFERENCE AMOUNT (DECIBEL SUM) | TOTAL TRANSMISSION POWER | COMMON CONTROL CHANNEL TRANSMISSION POWER |
|---|---|---|---|---|
| 1 | EXCESSIVE | UPPER SIDE IMBALANCED | HIGH LOAD | DECREASE |
| 2 | | | LOW LOAD | NO-UPDATE |
| 3 | | BALANCED | HIGH LOAD | DECREASE |
| 4 | | | LOW LOAD | NO-UPDATE |
| 5 | | LOWER SIDE IMBALANCED | HIGH LOAD | NO-UPDATE |
| 6 | | | LOW LOAD | INCREASE |
| 7 | DETERIORATED | UPPER SIDE IMBALANCED | HIGH LOAD | DECREASE |
| 8 | | | LOW LOAD | NO-UPDATE |
| 9 | | BALANCED | HIGH LOAD | DECREASE |
| 10 | | | LOW LOAD | INCREASE |
| 11 | | LOWER SIDE IMBALANCED | HIGH LOAD | NO-UPDATE |
| 12 | | | LOW LOAD | INCREASE |

FIG.11

TOTAL TRANSMISSION POWER < PREDETERMINED VALUE

| SERVICE AREA | COMMON CONTROL CHANNEL TRANSMISSION POWER + UPLINK INTERFERENCE AMOUNT (DECIBEL SUM) | TOTAL TRANSMISSION POWER | COMMON CONTROL CHANNEL TRANSMISSION POWER |
|---|---|---|---|
| 13 | -------- | -------- | INCREASE |

BASE STATION AND TRANSMISSION POWER CONTROL METHOD

BACKGROUND OF THE INVENTION

1. Field of the Invention

The present invention generally relates to a base station for communicating with mobile stations that move within a service area including plural cells, and relates to a transmission power control method.

2. Description of the Related Art

When a conventional cellular mobile communication system forms a service area, especially in the wireless access scheme like W-CDMA in which the same frequencies are shared with adjacent cells, it is necessary to efficiently use apparatuses, sites, aggregated lines and frequencies while maximizing communication quality and system capacity.

For this purpose, before constructing a wireless base station, desk design using computer simulations and the like is performed to design the position and configuration of the base station, and wireless parameters such as a transmission power level of a downlink common control channel transmitted from the base station by predicting a service area and traffic. After constructing the wireless base station, it is necessary to periodically perform an actual survey of the service area, communication quality, and system capacity, and it is necessary to perform maintenance. As mentioned above, for constructing a wireless base station, it is necessary to perform complicated cell system designing/evaluation work (refer to non-patent document 1 and non-patent document 2, for example).

On the other hand, in a future cellular mobile communication system, since the band of occupied frequencies in the wireless access scheme is widened due to increase of throughput, that is, transmission speed per one user, there are tendencies for high frequency bands in which unoccupied frequencies remain to be used. Accordingly, propagation loss including diffraction loss due to land objects largely increases and transmission power of the system is limited due to requirements of apparatuses and safety, so that the allowable maximum cell radius decreases, wherein the diffraction loss due to land objects is a loss caused when a radio wave arrives at a position near the surface of the earth from the top of a building.

Therefore, it is becoming difficult to systematically form the service area using macro/micro cells by installing antennas at high positions such as a steel tower, housetop, mountaintop and the like that has been generally performed. Thus, there is a possibility that service area formation (cell downsizing) based on street micro-cells and pico-cells in which antennas are installed in higher density at positions lower than buildings will be mainstream. Service area development by cell downsizing is effective for overcoming the propagation loss and for increasing user throughput and system capacity. However, since the number of base stations largely increases, cell system design/evaluation become further complicated.

In addition, it becomes difficult to systematically form conventional hexagonal cells due to the cell downsizing. Therefore, a base station is required that can be adapted to the surrounding environment even when base stations are installed without planning and unevenly, and that can operate while avoiding unnecessary interference in cooperation with surrounding base stations. For achieving this purpose, an autonomous distributed cell forming method is proposed (refer to non-patent document 3, for example). According to the autonomous distributed cell forming method, in the micro-cell environment, the base station sets wireless parameters to form a cell autonomously in a distributed manner in order to simplify system designing/evaluation.

More precisely, in this method, the transmission power of the pilot channel that is one of the downlink common control channel sent from a base station is initialized, in every base station, to the same maximum transmission power level that can be set. Next, each mobile station in a handover area compares a received level of the channel with a required received level, and reports the comparison result to the base station as a control power amount, wherein the received level is a measured result such as received power, ratio of received power to interference power, and ratio of received power to total received power within the spreading band. Next, the base station simply averages the reported values from many mobile stations to determine optimum control power amount. Accordingly, the transmission power of the pilot channel is controlled so that the cell is formed.

However, in this case, it is necessary to predetermine the required received level for each cell environment comprising such as standard deviation of shadowing, correlation between base stations, cell radius and the like, by performing computer simulation or experiment such that an out-of-range ratio of mobile stations becomes equal to or less than a predetermined value. In addition, the control of the transmission power of the pilot channel is performed only once. Thus, when a base station is newly installed, it is necessary to initialize the transmission power of the pilot channel of all base stations again so that the service is interrupted.

[Non-patent document 1] Hayashi, et. al., IEICE General Conference 2000, B-5-81, "Study on transmission power distribution to downlink common control channel in W-CDMA scheme", March 2000.

[Non-patent document 2] Mori, et. al., IEICE General Conference 2000, B-5-34, "W-CDMA area evaluation experiment using received quality measurement system", March 2001.

[Non-patent document 3] Mogi, et. al., IEICE Society Conference, B-5-105, "autonomous distributed cell forming method using surrounding base station information in CDMA cellular system", September 2003.

However, above-mentioned conventional techniques have the following problems.

In the street micro-cells and the pico-cells that are smaller than the micro-cells, deviation of traffic distribution among cells is large. Therefore, in the case when there are large variations in cell radii, efficient cell formation cannot be necessarily performed by the conventional cell forming method for controlling transmission power of the pilot channel using only the received level of the pilot channel.

This problem is described with reference to FIG. 1. The mobile station determines a base station to be connected to based on the received level of the pilot channel. For example, when the mobile station receives pilot channels from plural base stations, a base station corresponding to the highest received level is called a main branch, a base station corresponding to a received level that differs from the level of the main branch by equal to or less than a predetermined value is called a major branch, and each of the other base stations is called a minor branch.

A major branch may exist or may not exit depending on the position of the mobile station. For example, when the mobile station exists near the center of the cell, namely, near a particular base station, received level of the main branch is very high, so that the differences between the received level of the main branch and other received levels become greater than the predetermined value. Thus, a major branch does not exist, and every other base station is a minor branch. On the other hand, when the mobile station exists near a border of cells, namely near a place located nearly equidistant from plural base stations, the difference between the received level of the main branch and a received level of another base station becomes equal to or less than the predetermined value so that a major branch exists. In the cellular mobile communication system using CDMA, the major branch is an object of soft handover (simultaneous connection).

In the following, a case where a mobile station exists on a line connecting a first base station and a second base station is considered with reference to FIG. 1. In the case shown in FIG. 1, the first base station forms a cell that is extremely large due to transmission power control of the pilot channel for forming the cell, and the second base station forms a cell that has a smaller radius and that is adjacent to the large cell.

The mobile station exists at a position nearer to the second base station than the first base station. However, since the received level of the pilot channel transmitted by the first base station is greater than the received level of the pilot channel transmitted by the second base station, the cell of the first base station becomes a main branch for the mobile station, and the cell of the second base station becomes a minor branch. Thus, the second base station is out of a soft-handover area. In this case, the mobile station accepts transmission power control from the first base station, so that the mobile station sets transmission power so as to obtain necessary communication quality for uplink to the first base station.

Since the first base station is further than the second base station from the viewpoint of the mobile station, the propagation loss is large so that the mobile station performs transmission with excessive power from the viewpoint of the second base station. Therefore, the second base station receives large interference from the mobile station.

If the second base station is a major branch that is an object of soft-handover, the communication quality of the uplink line needs to be satisfied in either of the first base station or the second base station, and the transmission power of the mobile station can be controlled by the second base station. Therefore, the above-mentioned interference does not occur. However, when difference between radii of cells adjacent to each other is large, there is a high probability that a base station that is not an object of soft-handover but is nearer than a connecting base station exists like the case shown in FIG. 1.

In addition, when a cell is formed only on the basis of the received level of the pilot channel without considering load status of the base station, the transmission power of the pilot channel may be increased even when the total transmission power of the base station is exceeding a limiting value (high workload state). As a result, the coverage is enlarged so that there occurs a problem in that call originating right is provided to many mobile stations and congestion may occur in downlink.

Further, increase of transmission power of the pilot channel in the high workload status causes increase of interference to communication channels. In the CDMA scheme in which the transmission power control is applied to communication channels, there is a problem in that downlink congestion occurs when the transmission power is increased for keeping communication quality of the communication channel.

Therefore, it is important to realize a mechanism for controlling excessive interference input to uplinks while considering coverage and downlink workload (congestion) status.

SUMMARY OF THE INVENTION

It is an object of the present invention to provide a base station and a transmission power control method for autonomously setting transmission power of the common control channel to form a cell while cooperating with surrounding base stations.

The object is achieved by a base station including:

a service area status determination unit configured to determine status of a service area of the base station based on received signals from mobile stations;

a total transmission power determination unit configured to determine status of total transmission power of the base station based on total transmission power of surrounding base stations;

a transmission power determination unit configured to determine transmission power of a common control channel of the base station based on the status of the service area and the status of the total transmission power; and a transmission power setting unit configured to set the transmission power determined by the transmission power determination unit.

According to the base station, the transmission power of the common control channel can be controlled based on the status of the service area and the wireless resource of the base station that is total transmission power, for example.

The object is also achieved by a transmission power control method for use in a base station, the transmission power control method including:

a receiving step of receiving signals from mobile stations;

a service area status determination step of determining status of a service area of the base station based on the received signals from the mobile stations;

a total transmission power determination step of determining status of total transmission power of the base station based on total transmission power of surrounding base stations;

a transmission power determination step of determining transmission power of a common control channel of the base station based on the status of the service area and the status of the total transmission power; and a transmission power setting step of setting the transmission power determined in the transmission power determination step.

According to the method, the transmission power of the common control channel can be controlled based on the status of the service area and the wireless resource of the base station that is total transmission power, for example, so that the cell can be formed.

According to the present invention, a base station and a transmission power control method for autonomously setting transmission power of the common control channel to form a cell while cooperating with surrounding base stations can be obtained.

BRIEF DESCRIPTION OF THE DRAWINGS

Other objects, features and advantages of the present invention will become more apparent from the following detailed description when read in conjunction with the accompanying drawings, in which:

FIG. 4 is a figure for explaining measurement of a wireless resource in the base station;

FIGS. 5A and 5B show exchanging routes for status information message;

FIG. 6 is a figure for explaining a method for determining the status of a service area;

FIG. 7 is a flowchart showing a method for determining the status of a service area;

FIG. 8 is a figure for explaining workload determination of base station total transmission power;

FIG. 10 is a figure for explaining a transmission power control method for the common control channel;

FIG. 11 is a figure for explaining a transmission power control method for the common control channel;

DETAILED DESCRIPTION OF THE PREFERRED EMBODIMENTS

In the following, embodiments of the present invention are described with reference to figures. In the figures for describing the embodiments, same references are used for components having the same functions.

Figure 1:
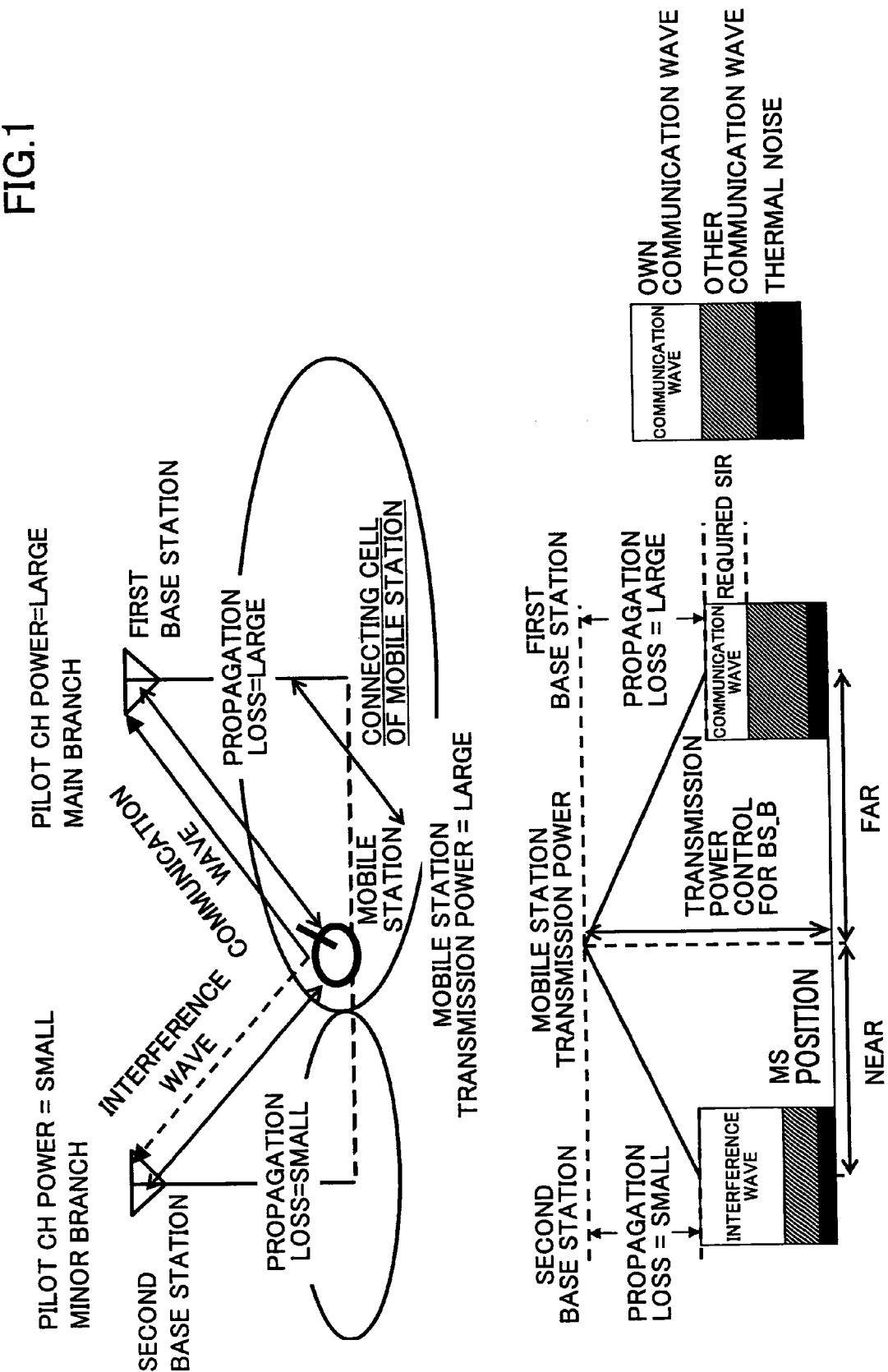
FIG. 1 is a figure for explaining increase of uplink interference amount due to cell radius imbalance.
Figure 2:
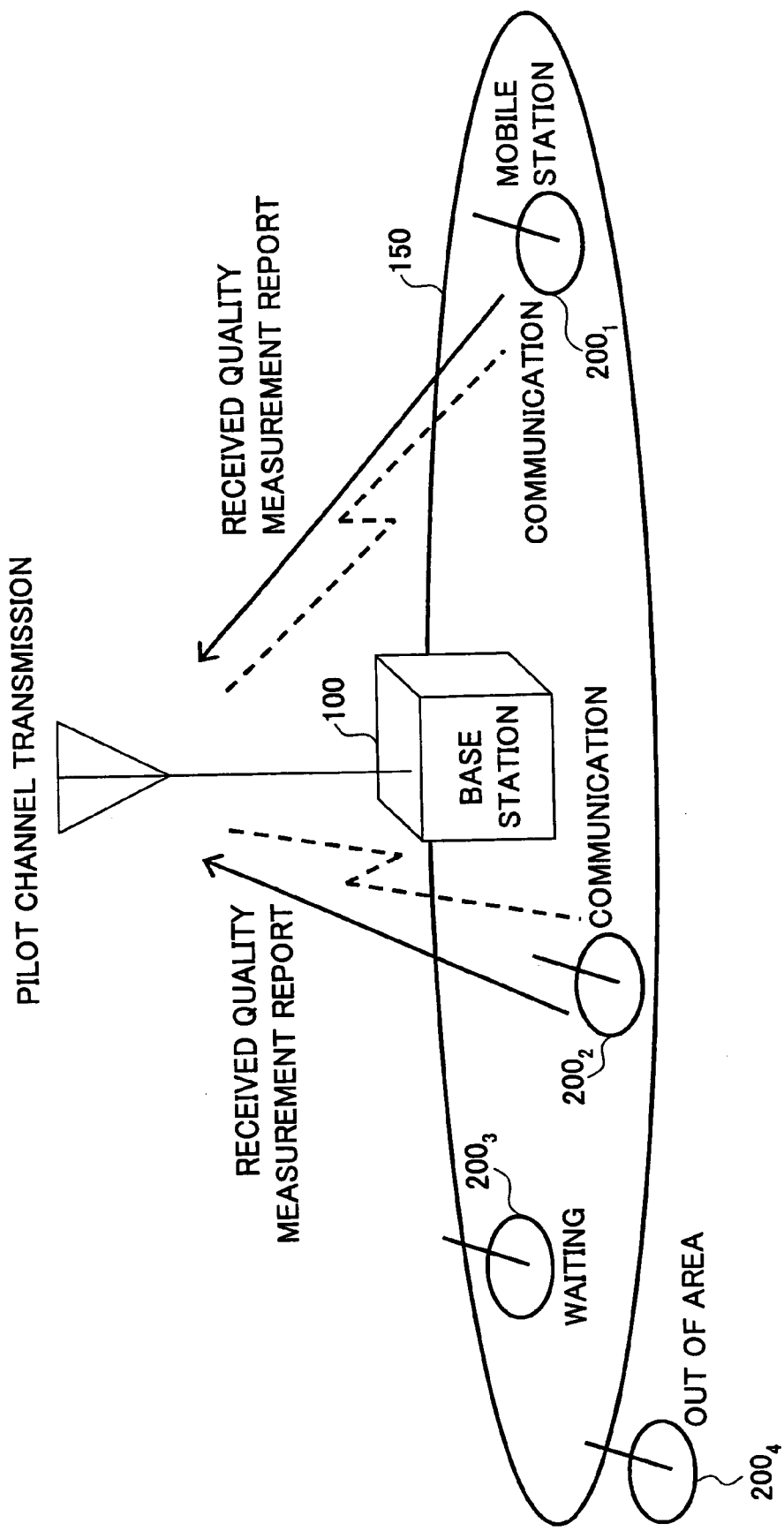
FIG. 2 shows a mobile communication system of an embodiment of the present invention.

In the following a mobile communication system of the embodiment of the present invention is described with reference to FIG. 2.

The mobile communication system of the present embodiment includes a base station 100 and mobile stations 200. In each of plural adjacent cells in the mobile communication system, each mobile station in the cell and a base station forming the cell share the same frequency for communications. As shown in FIG. 2, mobile stations $200_1$ and $200_2$ communicating with the base station 100 and a mobile station $200_3$ in a standby status exist in a cell 150 formed by the base station 100. In addition, a mobile station $200_4$ in an out-of-area status exists outside of the cell 150.

The mobile communication system of this embodiment compares uplink interference amount and downlink total transmission power measured in the base station side in addition to measurement results in the mobile station with uplink interference amount and downlink total transmission power measured in surrounding base stations so as to detect workload status of uplink/downlink lines of own base station. Then, the base station controls transmission power of the common control channel (pilot channel, for example) without performing initialization for every base station. In addition, the mobile communication system sets the coverage of the cell by controlling transmission power of the common control channel of each base station.

Figure 3:
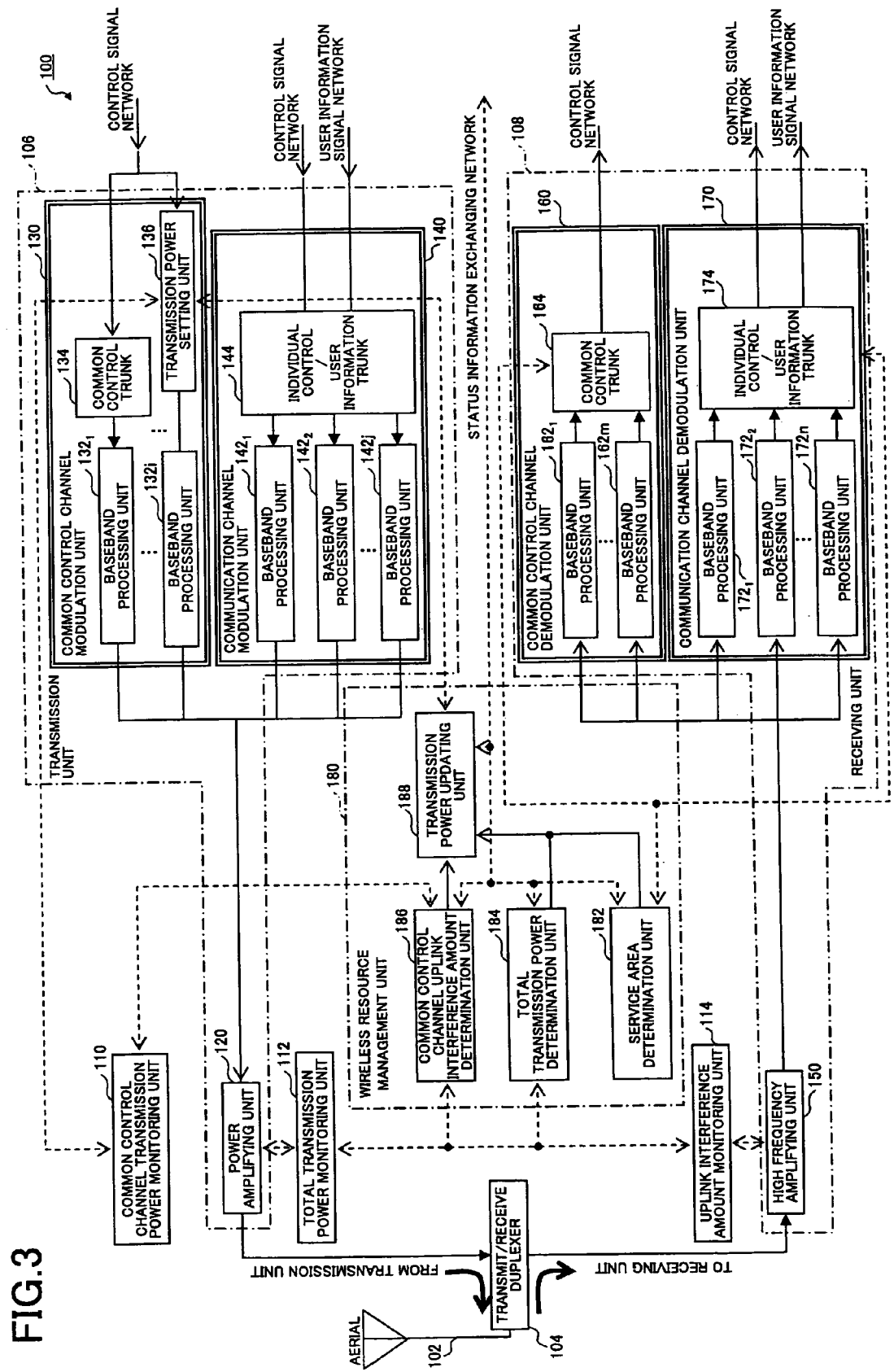
FIG. 3 is a block diagram of a base station of an embodiment of the present invention.

Next, the base station of this embodiment of the present invention is described with reference to FIG. 3.

The base station 100 of this embodiment includes an aerial 102, a transmit/receive duplexer 104 connected to the aerial 102, a transmission unit 106 and a receiving unit 108 connected to the transmit/receive duplexer 104, a common control channel transmission power monitoring unit 110 connected to the transmission unit 106, and a total transmission power monitoring unit 112, a wireless resource management unit 180, and an uplink interference amount monitoring unit 114 connected to the receiving unit 108. The wireless resource management unit 180 is connected to the common control channel transmission power monitoring unit 110, the total transmission power monitoring unit 112, the uplink interference amount monitoring unit 114 and the receiving unit 108. The wireless resource management unit 180 sends and receives status information via a below-mentioned status information exchanging network.

The transmission unit 106 includes a power amplifying unit 120 connected to the transmit/receive duplexer 104 and to the total transmission power monitoring unit 112, and a common control channel modulation unit 130 and a communication channel modulation unit 140 that are connected to the power amplifying unit 120. The common control channel modulation unit 130 includes baseband processing units $132_1 \sim 132_i$ (i is a positive integer) connected to the power amplifying unit 120, a common control trunk 134 connected to baseband processing units $132_1 \sim 132_{i-1}$ and receiving a control signal from the control signal network, and a transmission power setting unit 136. The transmission power setting unit 136 is connected to the baseband processing unit $132_i$, and the wireless resource management unit 180, the common control channel transmission power monitoring unit 110, and the transmission power setting unit 136 receive a control signal from the control signal network.

The communication channel modulation unit 140 includes baseband processing units $142_1 \sim 142_j$ (j is a positive integer) and an individual control/user information trunk 144. The baseband processing units $142_1 \sim 142_j$ are connected to the power amplifying unit 120. The individual control/user information trunk 144 is connected to the baseband processing units $142_1 \sim 142_j$ and receives a control signal and user information from the control signal network and a user information signal network, respectively.

The receiving unit 108 includes a high frequency amplifying unit 150, a common control channel demodulation unit 160 and a communication channel demodulation unit 170. The high frequency amplifying unit 150 is connected to the transmit/receive duplexer 104 and the uplink interference amount monitoring unit 114. The common control channel demodulation unit 160 and the communication channel demodulation unit 170 are connected to the high frequency amplifying unit 150 and to the wireless resource management unit 180. The common control channel demodulation unit 160 includes baseband processing units $162_1 \sim 162_m$ (m is a positive integer) and a common control trunk 164. The baseband processing units $162_1 \sim 162_m$ are connected to the high frequency amplifying unit 150. The common control trunk 164 is connected to the baseband processing units $162_1 \sim 162_m$ and the wireless resource management unit 180. The common control trunk 164 sends a control signal to the control signal network.

The communication channel demodulation unit 170 includes baseband processing units 172₁~172ₙ (n is a positive integer) and an individual control/user information trunk 174. The baseband processing units 172₁~172ₙ are connected to the high frequency amplifying unit 150. The individual control/user information trunk 174 is connected to the baseband processing units 172₁~172ₙ and to the wireless resource management unit 180. The individual control/user information trunk 174 sends a control signal and user information to the control signal network and the user information signal networks respectively.

The wireless resource management unit 180 includes a service area determination unit 182, a total transmission power determination unit 184, a common control channel/uplink interference amount determination unit 186, and a transmission power updating unit 188. The service area determination unit 182 is connected to the common control trunk 164 and the individual control/user information trunk 174. The total transmission power determination unit 184 is connected to the total transmission power monitoring unit 112. The common control channel/uplink interference amount determination unit 186 is connected to the uplink interference amount monitoring unit 114 and the common control channel transmission power monitoring unit 110. The transmission power updating unit 188 is connected to the service area determination unit 182, the total transmission power determination unit 184, the common control channel/uplink interference amount determination unit 186, and the transmission power setting unit 136.

Each of the service area determination unit 182, the total transmission power determination unit 184, and the common control channel/uplink interference amount determination unit 186 sends and receives status information via the status information exchange network. The transmission power updating unit 188 sends and receives transmission power information via the status information exchange network.

The control signal network is for exchanging control signals on moving management and call control necessary for realizing operations of the mobile communication system. The user information signal network is a network for exchanging communication information of users and individual control information. The status information exchange network is a network for exchanging status information messages and transmission power information.

Each of the common control trunk 134, the individual control/user information trunk 144, the common control trunk 164, and the individual control/user information trunk 174 performs format conversion for signal mapping between the control signal network and the wireless channel, and between the user information network and the wireless channel.

The baseband processing units 132, 142, 162 and 172 perform spreading/despreading processes with spreading code, modulation/demodulation, frequency conversion and the like.

The power amplifying unit 120 amplifies power of input signals from the common control channel modulation unit 130 and the communication channel modulation unit 140.

The high frequency amplifying unit 150 collectively amplifies all received signals.

The transmit/receive duplexer 104 distributes uplink and downlink signals to/from the aerial 102, the power amplifying unit 120 and the high frequency amplifying unit 150.

The common control channel transmission power monitoring unit 110 performs statistical processing on information indicating transmission power of the common control channel supplied from the transmission power setting unit 136, and supplies the result to the common control channel/uplink interference amount determination unit 186.

The total transmission power monitoring unit 112 performs statistical processing on information indicating total transmission power input from the power amplifying unit 120, and supplies the result to the total transmission power determination unit 184.

The uplink interference amount monitoring unit 114 performs statistical processing on uplink interference amount information supplied from the high frequency amplifying unit 150, and supplies the result to the common control channel/uplink interference amount determination unit 186.

At least one of the common control trunk 164 of the common control channel demodulation unit 160 and the individual control/user information trunk 174 of the communication channel demodulation unit 170 extracts status information of the service area received from the mobile station 200 from the channel and supplies the status information to the service area determination unit 182.

The wireless resource management unit 180 determines transmission power of the common control channel based on the status information exchanged via the status information exchange network and based on input signals from the common control channel transmission power monitoring unit 110, the total transmission power monitoring unit 112, the uplink interference amount monitoring unit 114, the common control trunk 164, and the individual control/user information trunk 174, and supplies a control signal of the determined transmission power to the transmission power setting unit 136.

The wireless resource management unit 180 can be provided outside of the base station such as in a base station control station. But, by providing the wireless resource management unit 180 inside of the base station 100, time delay for reflecting the determined transmission power to the transmission power setting unit 136 can be decreased so that it becomes possible to follow status change at high speed.

The control signal from the control signal network is input to the common control trunk 134 and the transmission power setting unit 136. Format conversion is performed for the control signal input to the common control trunk 134 for performing signal mapping with the wireless channel in the common control trunk 134. After that, the control signal is input to the baseband processing unit 132. The baseband processing unit 132 performs spreading processing with spreading code, and modulation processing and frequency conversion processing on the control signal on which the format conversion has been performed, so that the control signal is input to the power amplifying unit 120. The power amplifying unit 120 amplifies the power of the input control signal, and the control signal is distributed to the downlink line at the transmit/receive duplexer 104 and is transmitted from the aerial 102.

The transmission power setting unit 136 sets coverage of a cell by setting transmission power based on the input control signal. The information of the transmission power is supplied to the baseband processing unit 132 and the common control channel transmission power monitoring unit 110. The baseband processing unit 132 performs spreading processing with spreading code, modulation processing and frequency conversion processing on the information of the supplied transmission power, and the information is supplied to the power amplifying unit 120. The power amplifying unit 120 amplifies the power of the information of the transmission power on which spreading processing and the like have been performed. Then, the information is distributed to the downlink line at the transmit/receive duplexer 104 so as to be transmitted from the aerial 102. In addition, the power amplifying unit 120 supplies information of total transmission power to the total transmission power monitoring unit 112.

Statistical processing is performed on the information of the transmission power supplied to the common control channel transmission power monitoring unit 110, and is supplied to the common control channel/uplink interference amount determination unit 186.

The control signal from the control signal network and the user information from the user information signal network are supplied to the individual control/user information trunk 144. The individual control/user information trunk 144 performs format conversion for performing signal mapping between the supplied information and the wireless channel. After that, the control signal and the user information are supplied to the baseband processing unit 142. The baseband processing unit 142 performs spreading processing with spreading code, modulation processing and frequency conversion processing on the control signal and the user information on which format conversion has been performed. Then, the control signal and the user information are supplied to the power amplifying unit 120. The power amplifying unit 120 amplifies power of the control signal and the user information on which spreading processing and the like have been performed. Then, the control signal and the user information are distributed to the downlink line at the transmit/receive duplexer 104 so as to be transmitted from the aerial 102. In addition, the power amplifying unit 120 supplies information of the total transmission power to the total transmission power monitoring unit 112. Statistical processing is performed on the information of the total transmission power supplied to the total transmission power monitoring unit 112, and the result is supplied to the total transmission power determination unit 184.

A control signal and user information from the aerial 102 are distributed to the uplink line at the transmit/receive duplexer 104, and are supplied to the high frequency amplifying unit 150. The control signal and the user information are collectively amplified at the high frequency amplifying unit 150. In addition, uplink interference amount is measured and the information of the uplink interference amount is supplied to the interference amount monitoring unit 114. The amplified control signal is supplied to the baseband processing unit 162, and the amplified control signal and user information are supplied to the baseband processing unit 172. Statistical processing is performed on the information of the uplink interference amount supplied to the uplink interference amount monitoring unit 114, and the result is supplied to the common control channel/uplink interference amount determination unit 186. In addition, the baseband processing unit 162 performs despreading processing with the spreading code and demodulation on the amplified control signal so that the control signal is supplied to the common control trunk. The common control trunk unit 164 performs format conversion on the control signal on which despreading processing and the like have been performed for performing mapping between the signal and the control signal network. Then, the control signal is output to the control signal network. In addition, the common control trunk unit 164 extracts status information of the service area from the control signal and supplies the status information to the service area determination unit 182.

On the other hand, the baseband processing unit 172 performs despreading processing with spreading code and demodulation on the amplified control signal and user information, so that the control signal and the user information are supplied to the individual control/user information trunk 174. The individual control/user information trunk unit 174 performs format conversion on the control signal and the user information on which despreading processing has been performed for performing mapping to the control signal network and the user information signal network, so that the control signal and the user information are output to the control signal network and the user information signal network, respectively. In addition, the individual control/user information trunk 174 extracts status information of the service area from the control information and supplies the status information to the service area determination unit 182.

Next, information supplied to the wireless resource management unit 180 by the common control channel transmission power monitoring unit 110, the total transmission power monitoring unit 112 and the uplink interference amount monitoring unit 114 is described with reference to FIG. 4.

The common control channel transmission power monitoring unit 110 performs statistical processing on the wireless resource status of the own base station set in the transmission power setting unit 136, wherein the wireless resource status is common control channel transmission power that is pilot channel transmission power information, for example. Then, the common control channel transmission power monitoring unit 110 supplies the wireless resource status to the common control channel/uplink interference amount determination unit 186 in the wireless resource management unit 180. The common control channel/uplink interference amount determination unit 186 exchanges the supplied statistical value of the wireless resource status with surrounding base stations as a status information message via the status information exchanging network.

The total transmission power monitoring unit 112 performs statistical processing on the wireless resource status of the own base station measured in the power amplifying unit 120, wherein the wireless resource status is base station total transmission power, for example. Then, the total transmission power monitoring unit 112 supplies the wireless resource status to the total transmission power determination unit 184 in the wireless resource management unit 180. The total transmission power determination unit 184 exchanges the supplied statistical value of the wireless resource status with surrounding base stations as a status information message via the status information exchanging network.

The uplink interference amount monitoring unit 114 performs statistical processing on the wireless resource status of the own base station measured in the high frequency amplifying unit 150, wherein the wireless resource status is uplink interference amount, for example. Then, the uplink interference amount monitoring unit 114 supplies the wireless resource status to the common control channel/uplink interference amount determination unit 186 in the wireless resource management unit 180. The common control channel/uplink interference amount determination unit 186 exchanges the supplied statistical value of the wireless resource status with surrounding base stations as a status information message via the status information exchanging network.

Next, methods for exchanging the status information message among base stations are described with reference to FIGS. 5A and 5B.

The own base station $100_0$ exchanges the status information message with the surrounding base stations $100_1 \sim 100_6$.

Figure 5A:
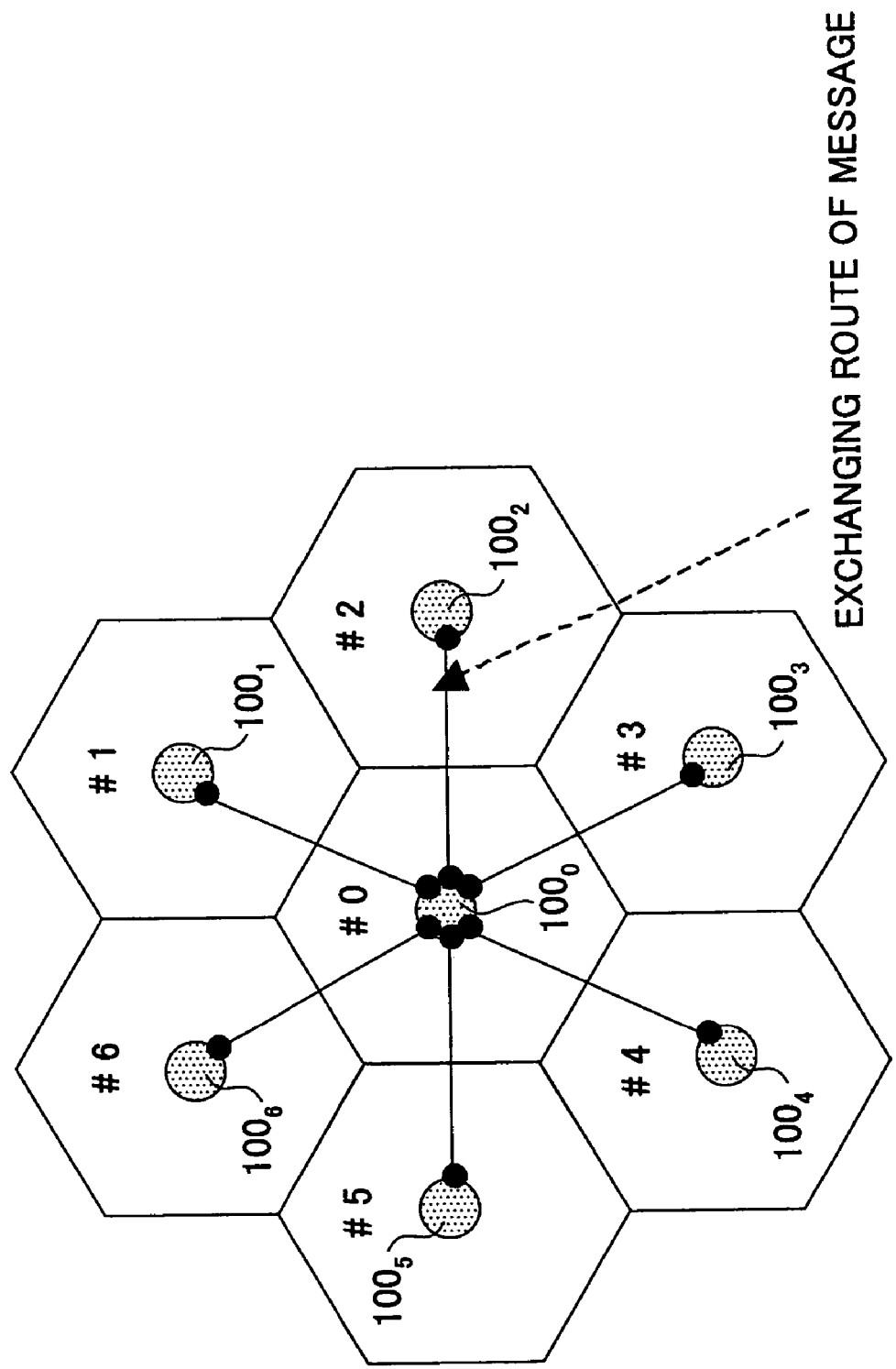

For example, as shown in FIG. 5A, the base station $100_0$ exchanges the status information message via a network that directly interconnects the base stations.

In this case, for example, the base station $100_0$ that forms the cell #0 causes a mobile station to report an identifier of the base station $100_1$, wherein the mobile station exists in the cell #0 and near a border of an adjacent cell (cell #1, for example) so that the mobile station receives a notification signal from the base station $100_1$ that forms the cell #1. The base station $100_0$ sends the status of the service area and at least one of the above-mentioned pieces of information of the status of the wireless resource in the base station $100_1$ to the base station $100_1$ via a network that interconnects the base station $100_0$ and the base station $100_1$ so that status information is exchanged. In this case, the topology of the network is not limited to a particular one.

In addition, for example, as shown in FIG. 5B, a base station control station 300 that accommodates plural base stations 100 may be provided by layering the network. In this case, each base station communicates with the base station control station 300 so that the base station control station 300 stores the status information messages. Then, the base station control station 300 sends the stored status information message to each base station directly or via another base station control station.

In this case, for example, the base station $100_0$ that forms the cell #0 causes a mobile station to report an identifier of the base station $100_1$, wherein the mobile station exists in the cell #0 and near a border to an adjacent cell (cell #1, for example) so that the mobile station receives a notification signal from the base station $100_1$ that forms the cell #1. The base station $100_0$ sends status of the service area and at least one of above-mentioned pieces of information of the status of the wireless resource in the base station $100_1$ with the identifier of the base station $100_1$ to the base station control station 300 that accommodates the base station $100_0$ and the base station $100_1$. The base station control station 300 receives the status information of the service area and the like, and sends the information to the base station $100_1$ and other base stations corresponding to identifiers transmitted from the base station $100_0$ before, so that the status information is exchanged.

As mentioned above, the base station identifier included in a report from the base station 100 is used as the transmission destination of the status information message one after another. Alternatively, transmission destinations that have been used may be stored in the base station 100 or the base station control station 300 for use in transmission of the status information message. Accordingly, the base stations communicate with each other so that each base station can obtain the status of the wireless resources of the surrounding base stations.

Next, processes for determining the status of the service area performed by the service area determination unit 182 is described with reference to FIGS. 6 and 7.

A mobile station 200 enters into a communication status when the mobile station 200 needs to send control information such as position registration information and a periodic report for some reason to the base station 100 when the mobile station 200 originates a call or receives an incoming call.

In this case, the base station 100 transmits a pilot channel (downlink common control channel). Or, the base station 100 is always transmitting the pilot channel (step S702). The mobile station 200 in the communication status measures received quality of the pilot channel transmitted from the base stations 100, and reports the received quality to the connecting base station using individual control information in the uplink communication channel or using the uplink common control channel. The service area determination unit 182 receives the reported received quality of the pilot channel and accumulates the received quality (step S704).

Next, the service area determination unit 182 determines whether the number of received quality values becomes enough for calculating a cumulative probability distribution (step S706). When the number of received quality values is not enough for calculating the cumulative probability distribution (No in step S706), the process returns to step S704.

On the other hand, when the number of received quality values becomes enough for calculating the cumulative probability distribution (Yes in step S706), the service area determination unit 182 calculates the cumulative probability distribution of the received quality (step S708). Further, the service area determination unit 182 obtains a cumulative probability value by which the received quality is a service area determination threshold value by referring to the cumulative probability distribution (step S710).

Next, the service area determination unit 182 compares the cumulative probability value by which the received quality is the service area determination threshold value with a predetermined reference cumulative probability value (step S712). When the cumulative probability value is equal to or less than the reference cumulative probability value (Yes in step S712), the service area determination unit 182 determines that good received quality is achieved in a wide area more than expected. Next, the service area determination unit 182 determines whether the cumulative probability value is the same as the reference cumulative probability value (step S714). When the cumulative probability value is the same as the reference cumulative probability value (Yes in step S714), the service area determination unit 182 determines that the service area status is "proper". On the other hand, when the cumulative probability value is not the same as the reference cumulative probability value (No in step S714), the service area determination unit 182 determines that the service area status is "excessive".

On the other hand, when the cumulative probability value is greater than the reference cumulative probability value (No in step S712), the service area determination unit 182 determines that good received quality is not achieved in a wide area so as to determine that the service area status is "deteriorated" (step S720).

That is, among all mobile stations residing in a cell formed by a base station, when the ratio of mobile stations in which received quality of the common control channel transmitted by the base station is less than a threshold is equal to or greater than a predetermined value, it is determined that the status of the service area of the cell is "deteriorated". When the ratio is less than the predetermined value, it is determined that the status of the service area of the cell is "excessive".

For example, assuming that the received quality is $E_c/I_o$ (ratio of received power to total received power within spreading band), the service determination threshold is set to be from −20 dB to −14 dB, and the reference cumulative probability ratio is set to be from 1% to 10%, generally.

Next, operation of the total transmission power determination unit 184 is described with reference to FIG. 8.

The total transmission power determination unit 184 compares total transmission power of surrounding base stations sent as the status information message with total transmission power of the own base station so as to determine the status of the total transmission power of the own base station. For example, as shown in FIG. 8, the total transmission power determination unit 184 calculates an average of total transmission power values of the surrounding base stations #1-#6.

Then, the total transmission power determination unit 184 determines that the status is "high load" when the total transmission power of the own base station #0 is greater than the calculated average, and determines that the status is "low load" when the total transmission power of the own base station #0 is less than the calculated average. In FIG. 8, the status of the total transmission power of the own base station #0 is "low load". The calculation of the average for the surrounding base stations is not necessarily simple averaging. Other statistical processing such as obtaining a median value can be adopted.

Next, operation of the common control channel/uplink interference amount determination unit 186 is described with reference to FIG. 9.

The common control channel/uplink interference amount determination unit 186 compares a decibel sum of transmission power (or common control channel transmission power) and uplink interference amount of surrounding base stations sent as the status information message with a decibel sum of pilot channel transmission power and uplink interference amount of the own base station to determine the status of the decibel sum of pilot channel transmission power and uplink interference amount of the own base station. Accordingly, uplink and downlink status of the own base station and the surrounding base stations can be detected. For example, congestion status of the links can be detected.

Figure 9:
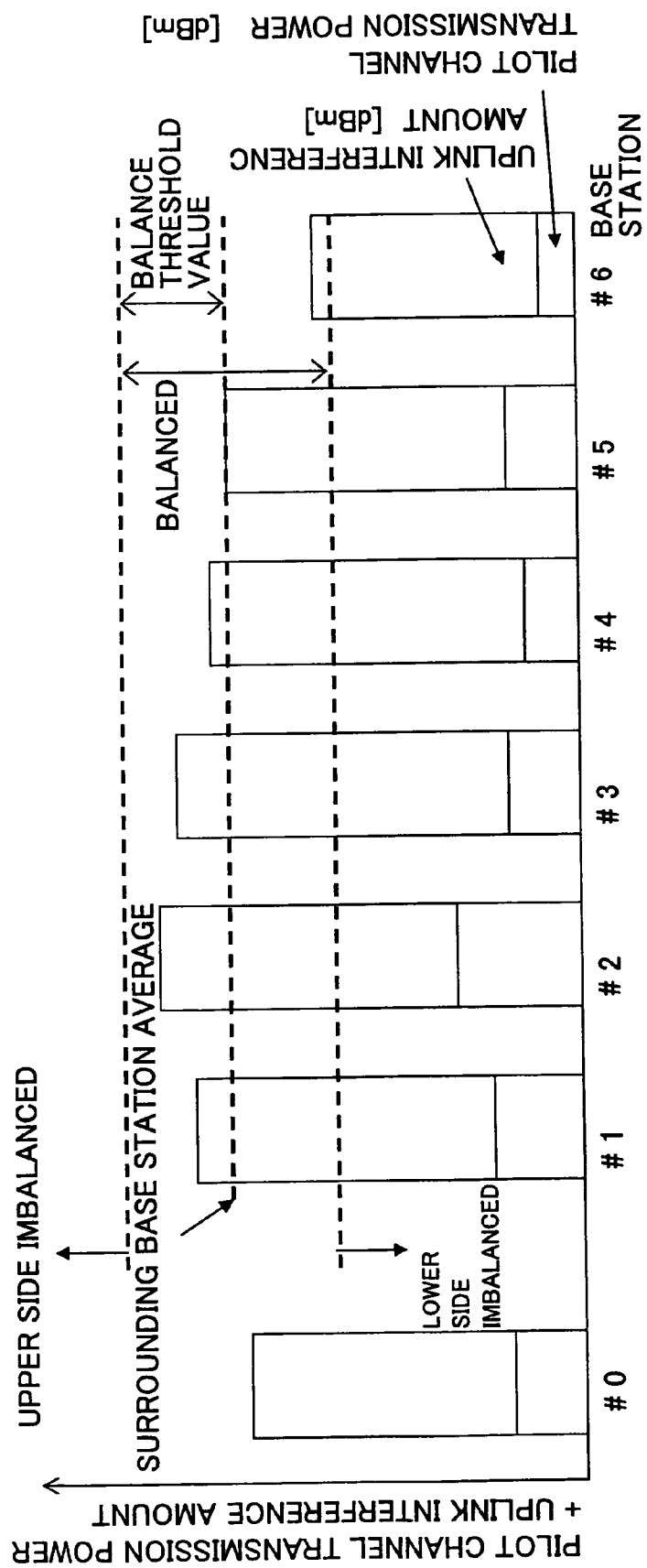
FIG. 9 is a figure for explaining balance determination for the decibel sum of pilot channel transmission power and uplink interference amount.

For example, as shown in FIG. 9, the common control channel/uplink interference amount determination unit 186 calculates an average of decibel sums of pilot channel transmission power and uplink interference amount for surrounding base stations. Then, the common control channel/uplink interference amount determination unit 186 determines that the status is "upper side imbalanced" when the decibel sum of the pilot transmission power and the uplink interference amount of the own base station is greater than the calculated average by equal to or greater than a predetermined balance threshold. When the decibel sum is less than the calculated average by equal to or greater than the predetermined balance threshold, it is determined that the status is "lower side imbalanced". When the difference between the calculated average and the decimal sum is less than the balance threshold, it is determined that the status is "balanced". For example, the balance threshold is set from 1 dB to 5 dB. In FIG. 9, the status of the decibel sum of the pilot channel transmission power and the uplink interference amount of the own base station is "balanced". The calculation of the average for the surrounding base stations is not necessarily simple averaging. Other statistical processing such as obtaining a median value can be adopted.

Next, operation of the transmission power updating unit 188 is described with reference to FIG. 10.

The transmission power updating unit 188 determines transmission power of the common control channel to be transmitted commonly for all mobile stations in the cell according to the status of the service area and the status of the wireless resource. Then, the transmission power updating unit 188 supplies the transmission power to the transmission power setting unit 136 as a control signal of the transmission power.

First, a case where the total transmission power is equal to or greater than a predetermined value determined by a coverage enlargement threshold indicating coverage enlargement region is described.

In the following, a case where the status of the service area is "excessive" is described.

When the sum of the common control channel transmission power and the uplink interference amount is "upper side imbalanced", the common control channel transmission power is decreased if the total transmission power is "high load", and the common control channel transmission power is not updated if the total transmission power is "low load".

When the sum of the common control channel transmission power and the uplink interference amount is "balanced", the common control channel transmission power is decreased if the total transmission power is "high load", and the common control channel transmission power is not updated if the total transmission power is "low load".

When the sum of the common control channel transmission power and the uplink interference amount is "lower side imbalanced", the common control channel transmission power is not updated if the total transmission power is "high load", and the common control channel transmission power is increased if the total transmission power is "low load".

Next, a case where the status of the service area is "deteriorated" is described.

When the sum of the common control channel transmission power and the uplink interference amount is "upper side imbalanced", the common control channel transmission power is decreased if the total transmission power is "high load", and the common control channel transmission power is not updated if the total transmission power is "low load".

When the sum of the common control channel transmission power and the uplink interference amount is "balanced", the common control channel transmission power is decreased if the total transmission power is "high load", and the common control channel transmission power is increased if the total transmission power is "low load".

When the sum of the common control channel transmission power and the uplink interference amount is "lower side imbalanced", the common control channel transmission power is not updated if the total transmission power is "high load", and the common control channel transmission power is increased if the total transmission power is "low load".

Accordingly, based on the comparison using the decibel sum of the common control channel transmission power and the uplink interference amount, the own base station controls transmission power of the common control channel. Accordingly, when the status is "upper side imbalanced", by decreasing the transmission power of the common control channel, the mobile station is informed that the base station is unfavorable for connection in view of uplink interference amount, so that the mobile station can perform handover to a better base station. As a result, uplink congestion of the surrounding base stations can be avoided.

When the status is "lower side imbalanced", by increasing the transmission power of the common control channel, the mobile station is informed that the base station is favorable for connection in view of uplink interference amount, so that the mobile station can perform handover to the base station that is better than surrounding base stations. As a result, uplink congestion of the own base station can be avoided.

In either case, the base station increases or decreases the transmission power based on comprehensive determination using the total transmission power and the status of the service area. For example, from the viewpoint of the total transmission power, the transmission power of the common control channel is desired to be increased when the status is "low load", and the transmission power of the common control channel is desired to be decreased when the status is "high load". However, when there is a conflict between the viewpoint of the total transmission power and another parameter, there may be a case where transmission power of the common control channel is unchanged even when the status is "low load" or "high load". More particularly, even when the status is "low load", if the decibel sum is "upper side imbalanced", the transmission power is not updated. In addition, even when the status is "high load", if the decibel sum is "lower side imbalanced", the transmission power is not updated.

Next, a case where the total transmission power is less than the predetermined value determined by the coverage enlargement threshold is described. In this case, as shown in FIG. 11, the transmission power updating unit 188 determines to increase the transmission power of the common control channel. That is, the transmission power updating unit 188 determines to increase the transmission power of the common control channel regardless of the status of the service area and the status of the wireless resource of the own base station, and the status of the service areas and the status of the wireless resources of other base stations.

Figure 12:
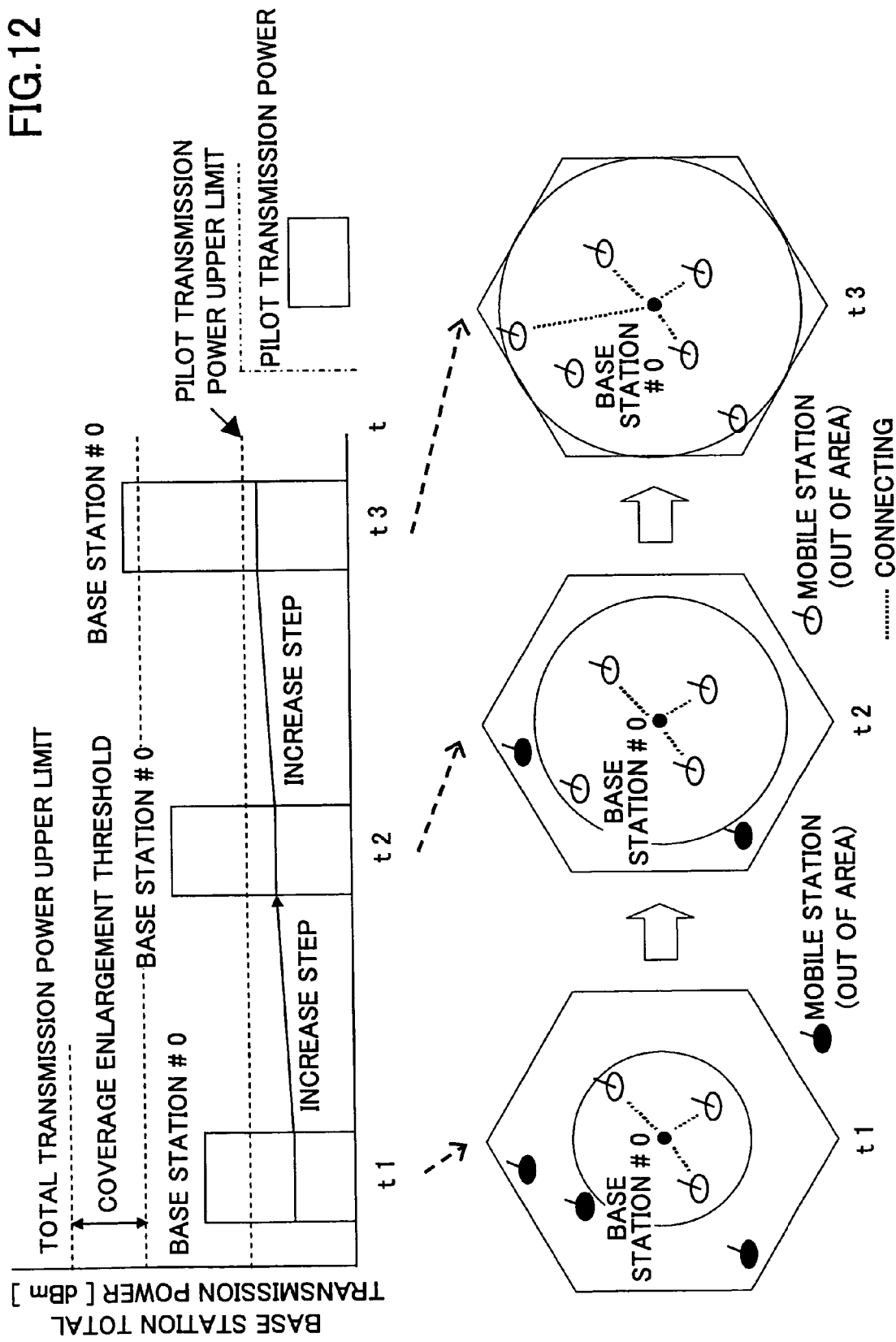
FIG. 12 is a figure for explaining a coverage enlargement method when total transmission power status is low workload.

Next, change of the status of the service area when changing the transmission power of the common control channel (pilot channel) is described with reference to FIG. 12.

The service area determination unit 182 obtains the cumulative probability value at the service area determination threshold using the received quality of the common control channel reported from mobile stations in communication, and compares the cumulative probability value with the reference cumulative probability value so as to determine the status of the service area.

When the downlink total transmission power is too small, the service area is deteriorated as shown at time t1. In this situation, if enough service area status is obtained for a mobile station in communication, there is a possibility that the transmission power will be kept low although there is a margin for the base station total transmission power.

In this case, a coverage enlargement threshold for correcting the coverage is predetermined for the upper limit of the total transmission power. When the total transmission power is less than the upper limit of the total transmission power by a value equal to or greater than the coverage enlargement threshold (for example, 1 dB-10 dB), the transmission power updating unit 188 increases the transmission power of the common control channel by 0.1 dB-1 dB, for example, within a predetermined range. As a result, the service area becomes proper as shown in time t2 and t3.

In this case, a pilot channel transmission power upper limit indicating an upper limit of the pilot channel transmission power may be predetermined, so that the pilot channel transmission power may be increased until it reaches the pilot channel transmission power upper limit.

Accordingly, degrading the status of the service area can be avoided when the downlink total transmission power is too small, so that the total transmission power that is the wireless resource can be efficiently utilized. In addition, even a base station like an independent cell that does not have surrounding base stations and that cannot receive the status information message can form a coverage.

Figure 13:
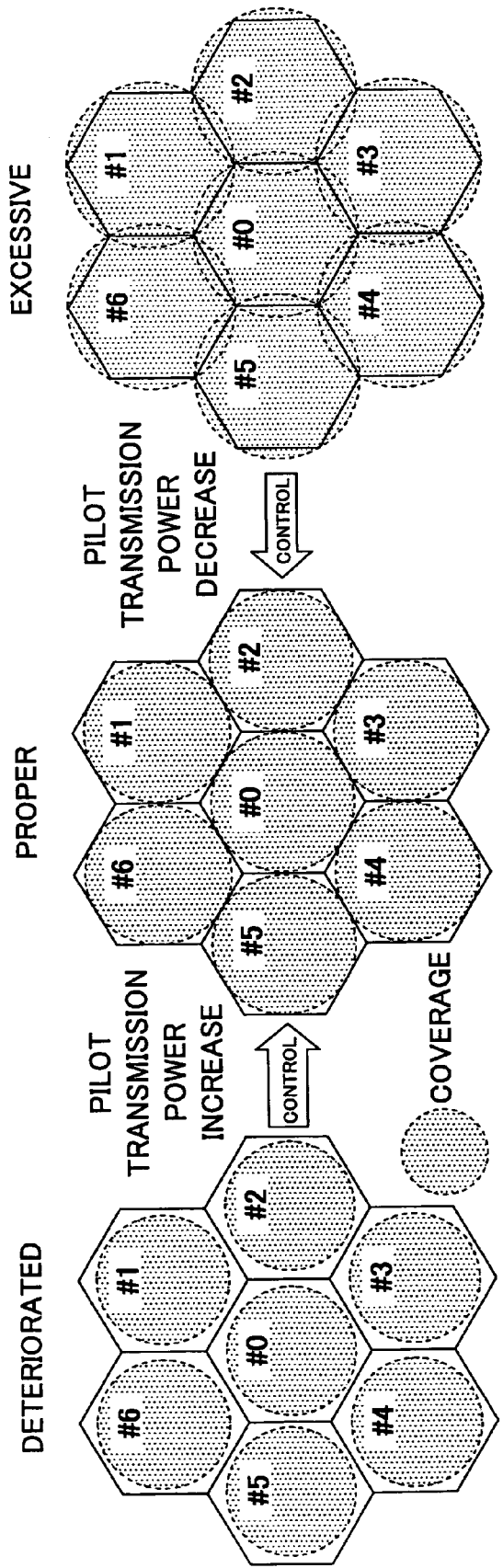
FIG. 13 is a figure for explaining power control of status of service area.

Next, change of the status of the service area in a case where the pilot channel transmission power is controlled is described with reference to FIG. 13.

As mentioned above, the service area determination unit 182 obtains the cumulative probability value at the service area determination threshold using the received quality of the common control channel reported from the mobile stations in communication, and compares the cumulative probability value with the reference cumulative probability value so as to determine the status of the service area.

When the service area determination unit 182 determines that the status of the service area is "deteriorated", the transmission power updating unit 188 increases the pilot transmission power to make the service area proper.

When the service area determination unit 182 determines that the status of the service area is "excessive", the transmission power updating unit 188 decreases the pilot transmission power to make the service area proper.

Figure 14:
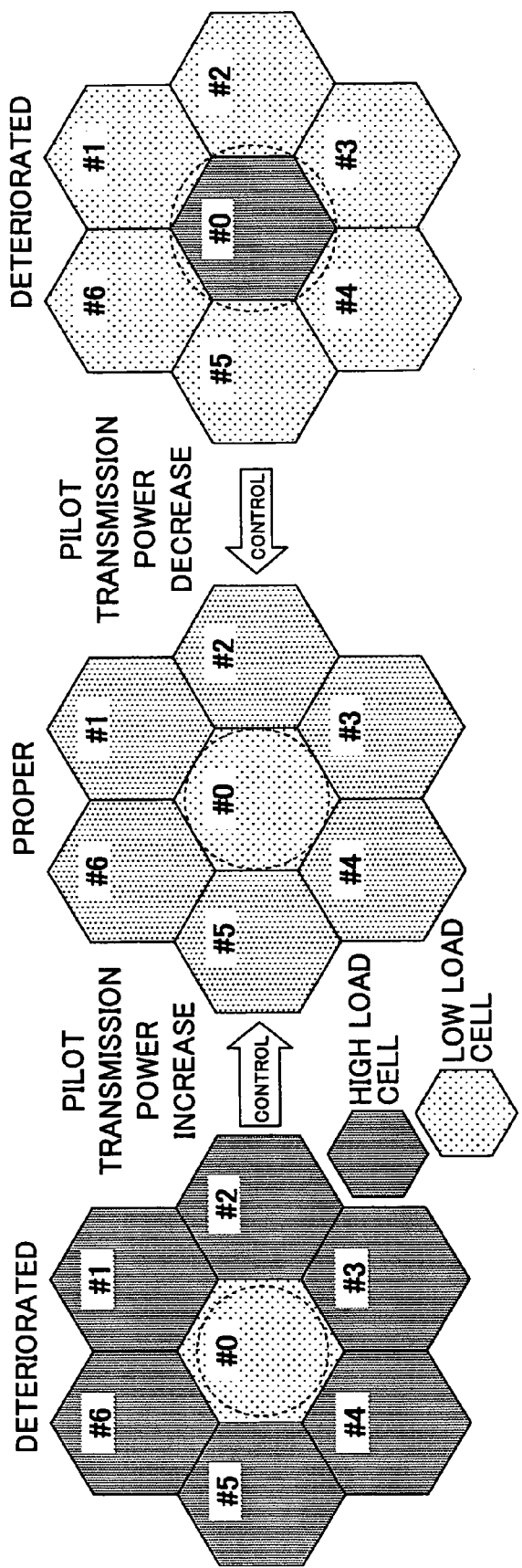
FIG. 14 is a figure for explaining control of workload of downlink total transmission power.

Next, control of total transmission power of the base station is described with reference to FIG. 14.

When the total transmission power determination unit 184 of the base station corresponding to the cell #0 determines that the status of the base station is "low load", the transmission power updating unit 188 increases the pilot power to make the total transmission power proper.

When the total transmission power determination unit 184 of the base station corresponding to the cell #0 determines that the status of the base station is "high load", the transmission power updating unit 188 decreases the pilot power to make the total transmission power proper.

Figure 15:
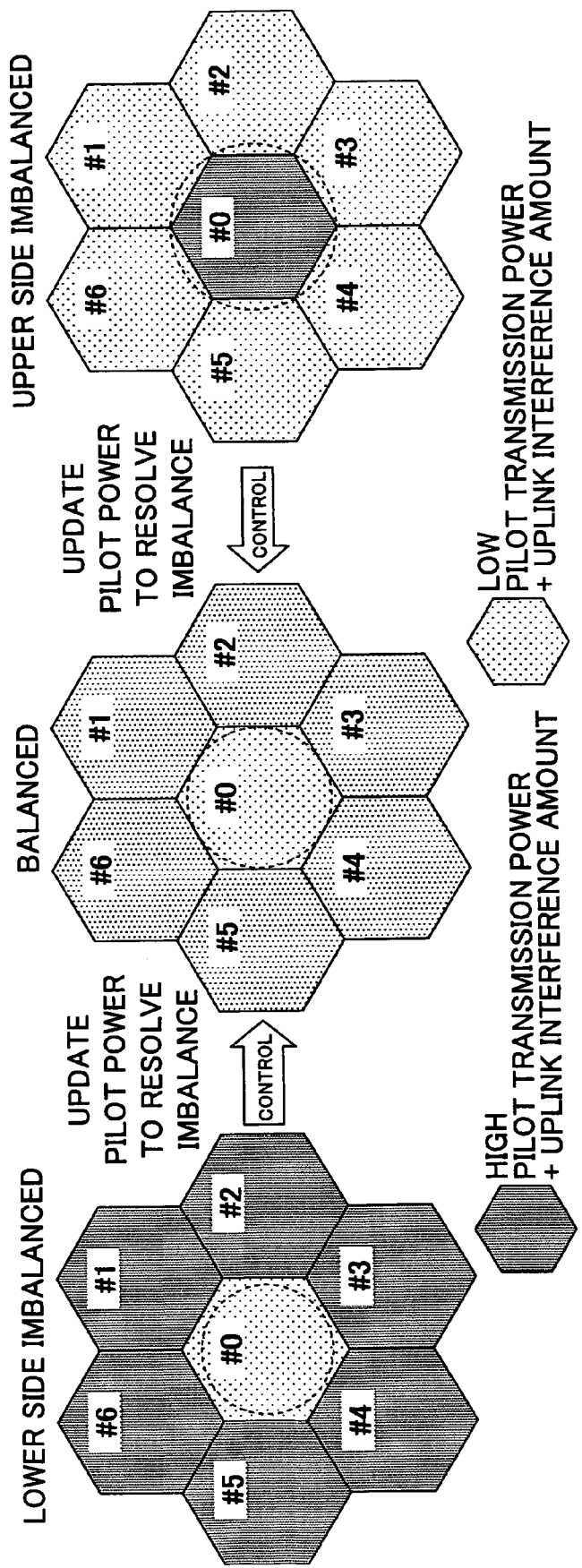
FIG. 15 is a figure for explaining control of uplink interference amount.

Next, control of uplink interference amount of the base station is described with reference to FIG. 15.

When the common control channel/uplink interference amount determination unit 186 of the base station corresponding to the cell #0 determines that the status of the base station is "lower side imbalanced", the transmission power updating unit 188 updates the pilot power to resolve the imbalance to make the status of the own base station "balanced".

When the common control channel/uplink interference amount determination unit 186 of the base station corresponding to the cell #0 determines that the status of the base station is "upper side imbalanced", the transmission power updating unit 188 updates the pilot power to resolve the imbalance to make the status of the own base station "balanced".

Figure 16:
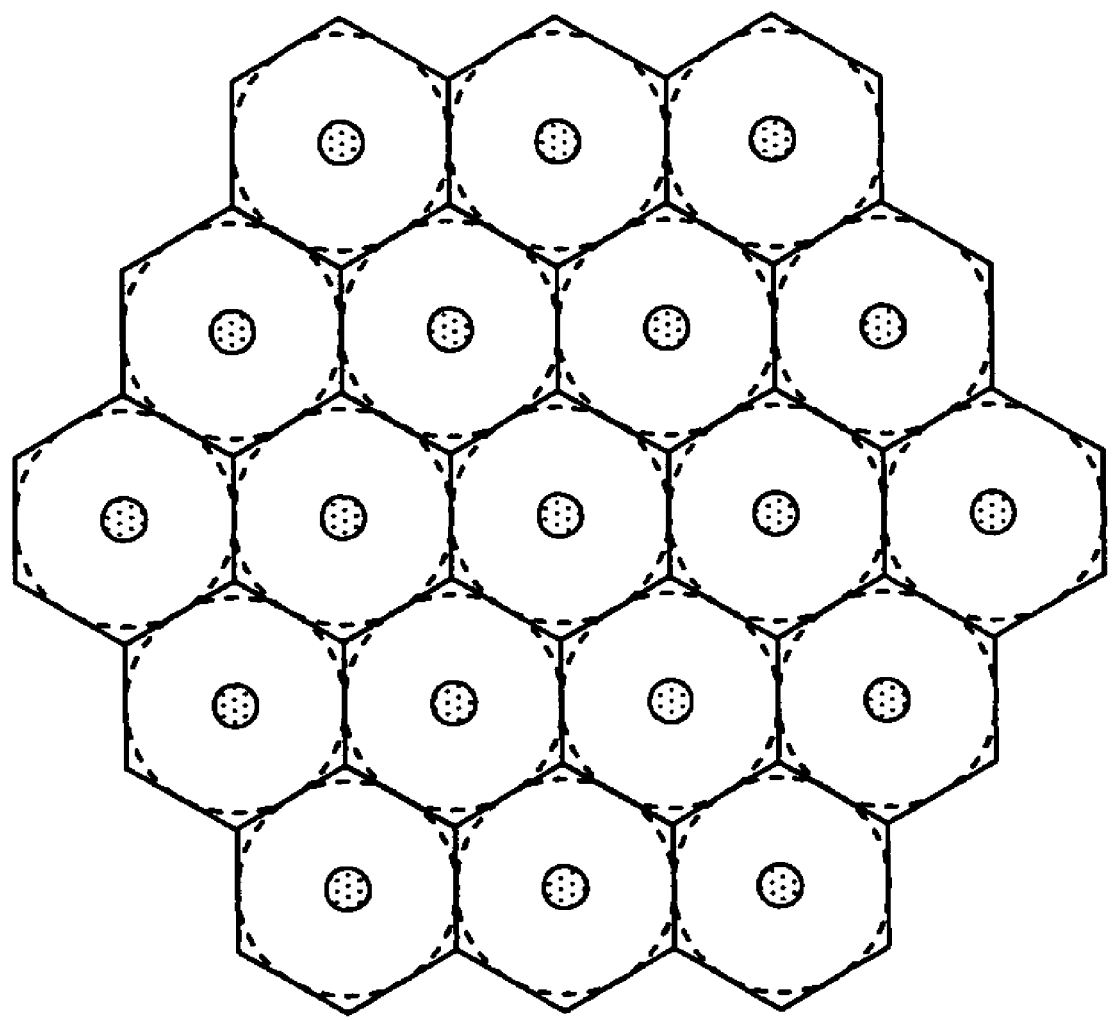
FIG. 16 shows a cell model based on which computer simulation is performed.

The control for determining and updating the transmission power is applied to a base station of a cell model shown in FIG. 16. Computer simulation is performed for obtaining accepted traffic amount (system capacity) and call loss rate (communication quality) in which cell radius is changed. The results are described with reference to FIGS. 17A, 17B, 18A and 18B.

Figure 17A:
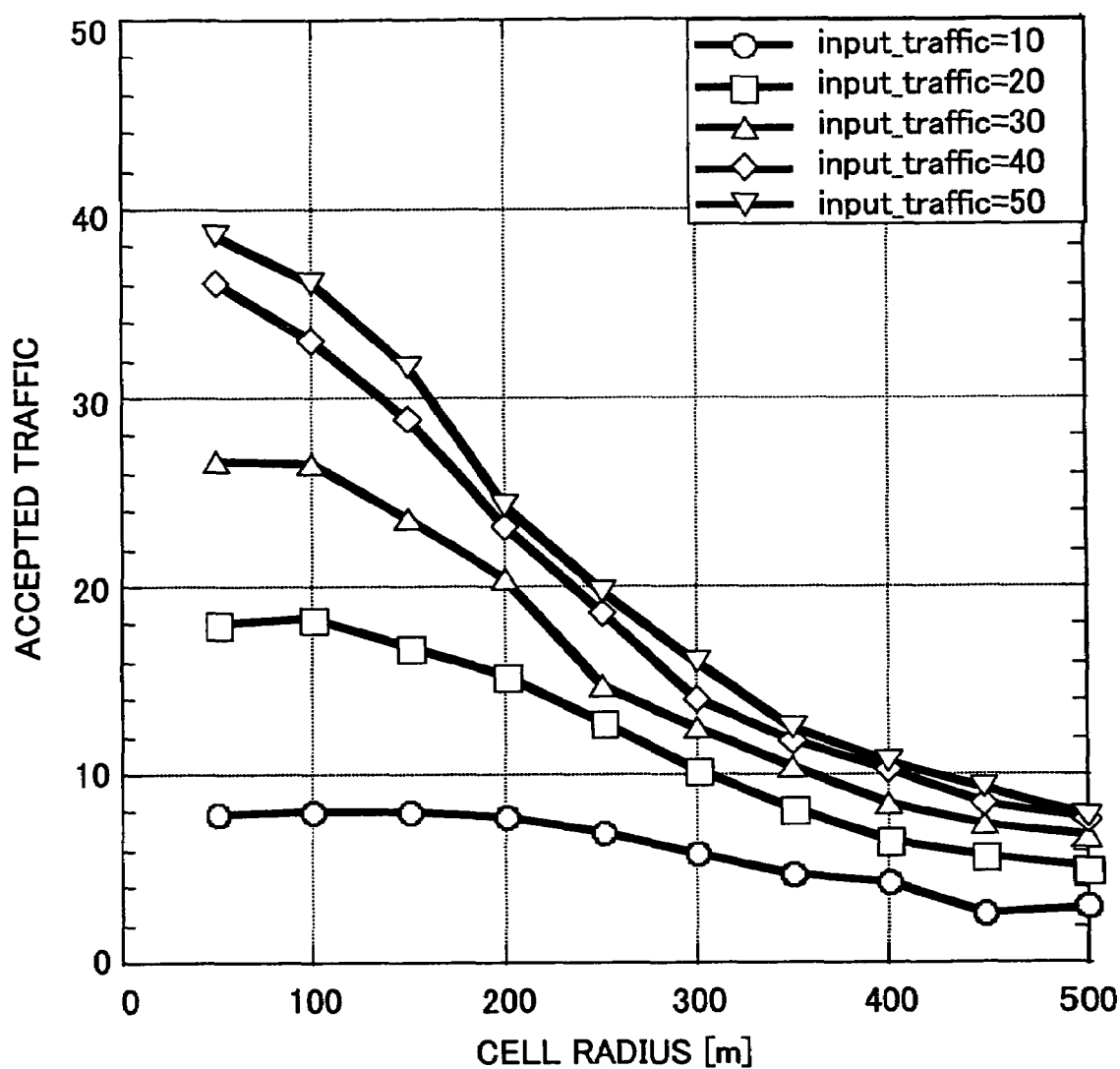
FIG. 17A shows a graph of accepted traffic amount based on manual optimization design.
Figure 17B:
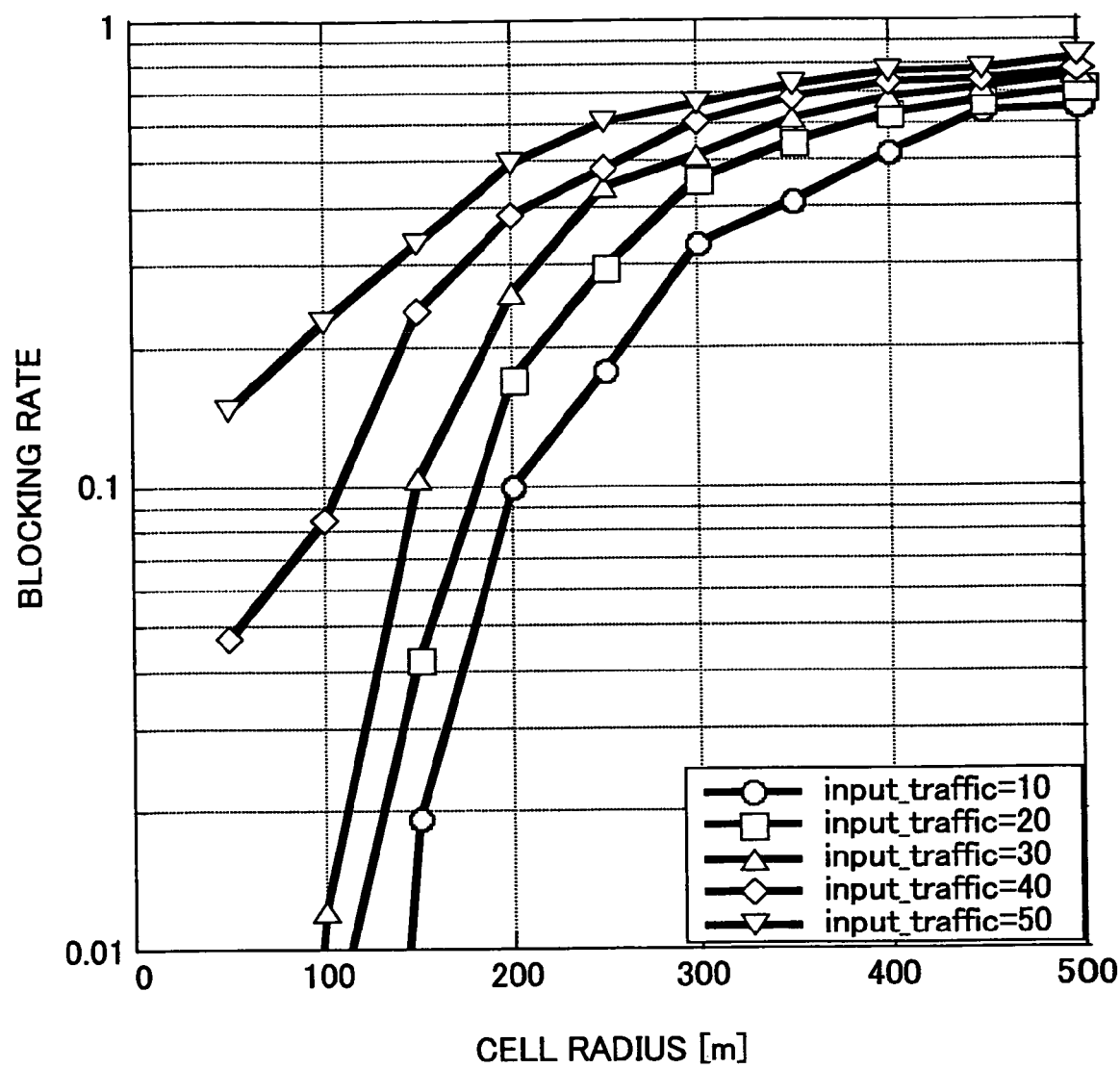
FIG. 17B shows a graph of call loss rate based on manual optimization design.

Each of FIGS. 17A and 17B shows a result of performing design such that the transmission power of the common control channel becomes optimum by manually changing the transmission power. Each of FIGS. 18A and 18B shows a result while successively setting the transmission power of the common control channel automatically using the present embodiment.

Figure 18A:
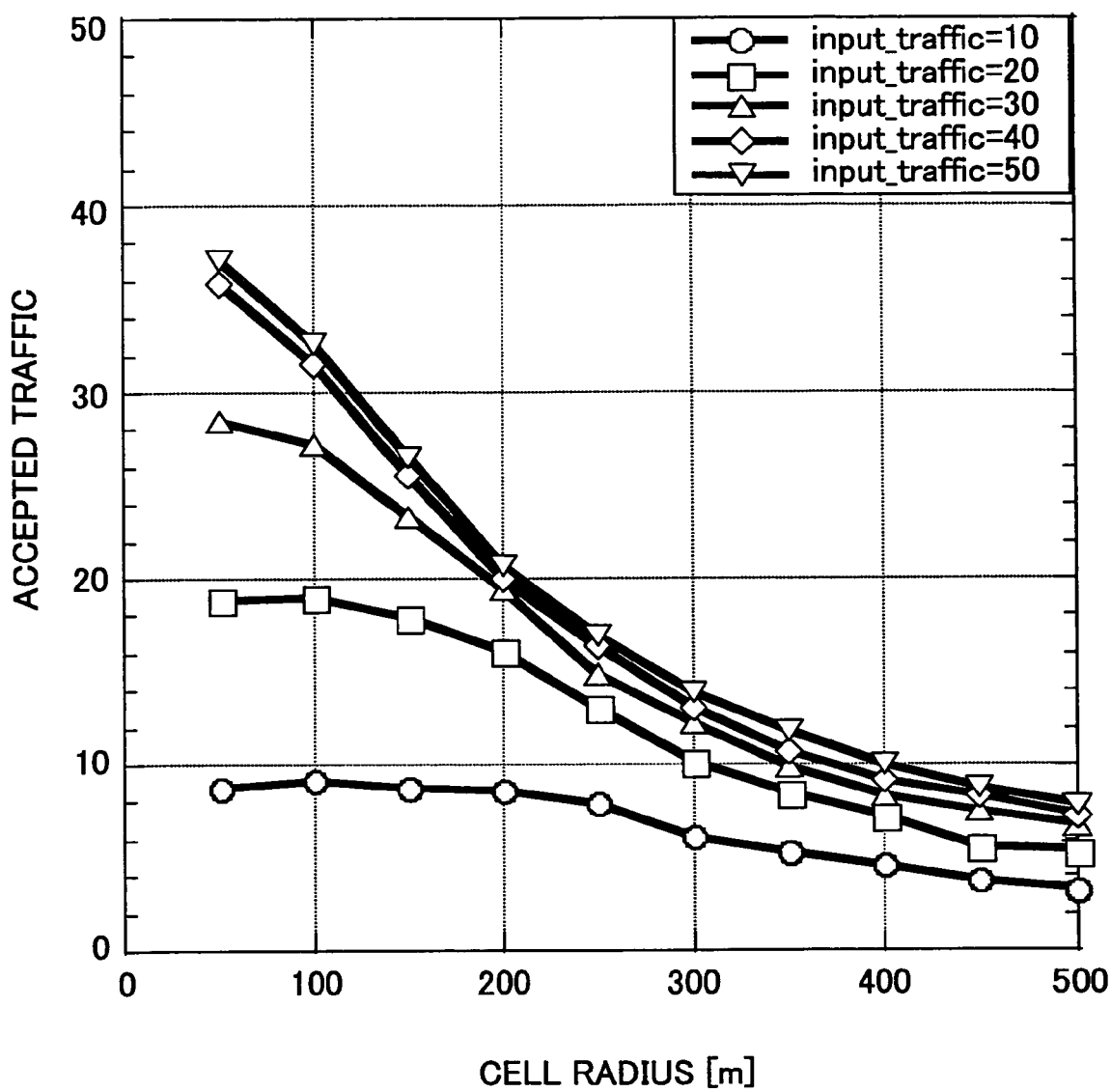
FIG. 18A shows a graph of accepted traffic amount based on automatic setting.
Figure 18B:
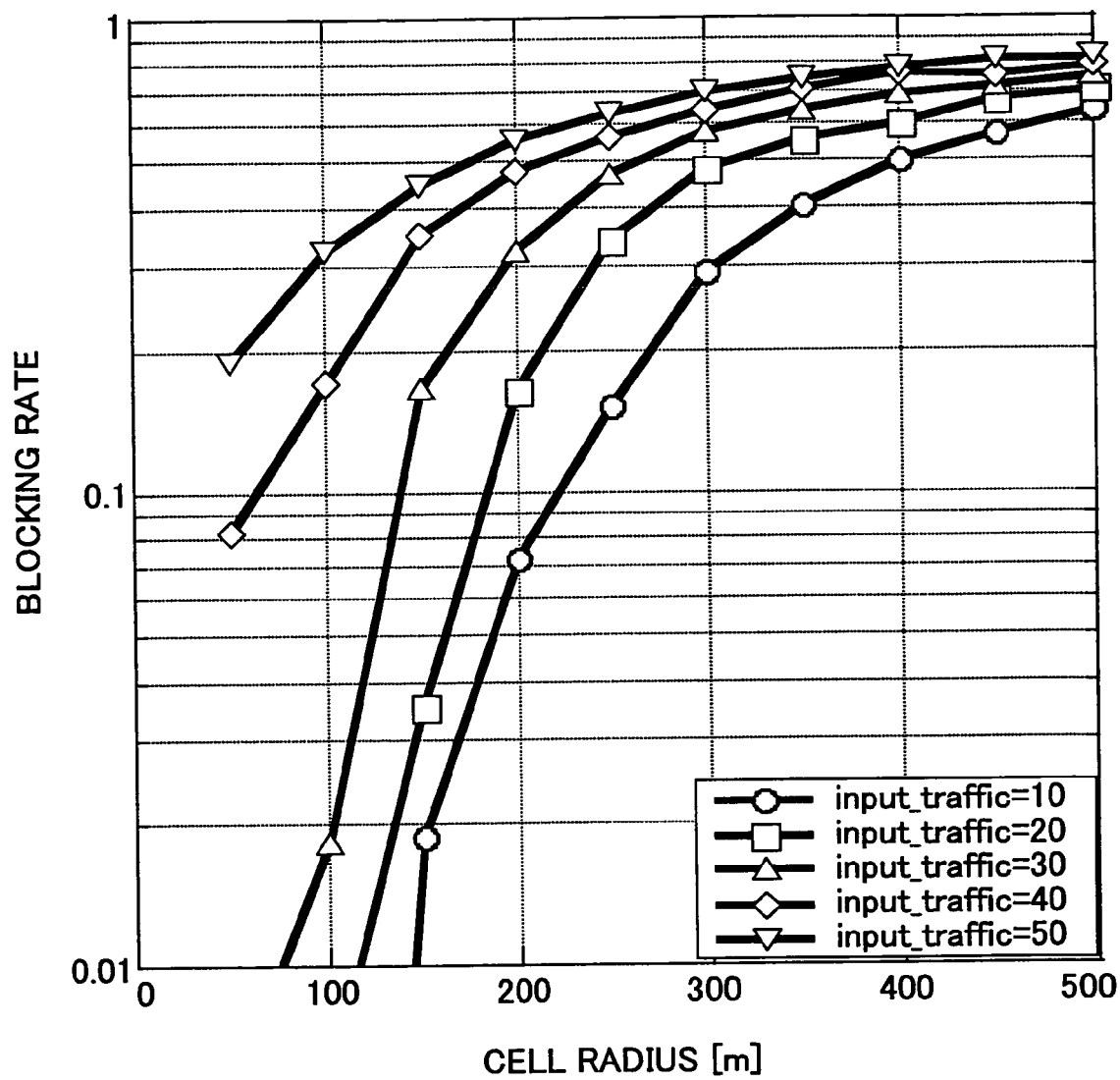
FIG. 18B shows a graph of call loss rate based on automatic setting.

In each of FIGS. 17A and 18A, the horizontal axis indicates cell radius, and the vertical axis indicates accepted traffic amount. In each of FIGS. 17B and 18B, the horizontal axis indicates cell radius, and the vertical axis indicates call loss rate.

It can be understood that the present embodiment can achieve the accepted traffic amount and the call loss rate almost the same as those of the manually designing results. Therefore, by automatically setting the transmission power of the common control channel as required using the present embodiment, the service area can be automatically formed and can be updated quickly without manual setting.

According to the above-mentioned embodiment, the base station is adapted to surrounding environment so as to form the cell by autonomously setting the transmission power of the common control channel that is a wireless parameter while cooperating with surrounding base stations. Therefore, it becomes possible to omit complicated cell system designing work.

In addition, the base station forms the cell based on common control channel transmission power control considering the status of the service area and considering the congestion status of uplinks and downlinks of the own base station and surrounding base stations. Therefore, efficiency for utilizing wireless resources can be improved so that a cellular mobile communication system providing good communication quality and large system capacity can be constructed. In addition, traffic load distribution among cells can be realized so that the congestion occurrence probability can be decreased. In addition, according to the traffic load distribution among cells due to proper cell formation, the system of the present embodiment can decrease events in which traffic cannot be carried which events occur when traffic exceeds prepared equipment amount in conventional technology.

In addition, by automatically forming the service area, the service area can be optimally updated as required while eliminating system setting work, so that the communication quality and the system capacity can be improved.

In addition, when the base station determines control amount of the common control channel transmission power internally, the speed of processing is higher than a case where the control is performed on the network side by adopting centralized control. Thus, according to the present embodiment, the cell can be formed more efficiently. In addition, by using the system of the present embodiment, apparatuses, sites, aggregated lines and frequencies can be effectively used.

INDUSTRIAL APPLICABILITY

The base station and the transmission power control method can be applied to a mobile communication system in which base stations are provided for each cell and each base station communicates with mobile stations moving in a service area including plural cells.

The present invention is not limited to the specifically disclosed embodiments, and variations and modifications may be made without departing from the scope of the invention.

The present application contains subject matter related to Japanese Patent Application No. 1.2004-322615, filed in the JPO on Nov. 5, 2004, the entire contents of which are incorporated herein by reference.

What is claimed is:

1. A base station comprising:
    a service area status determination unit configured to determine status of a service area of the base station based on received signals from a plurality of mobile stations;
    a total transmission power determination unit configured to determine status of total transmission power of the base station based on total transmission power of surrounding base stations;
    a transmission power determination unit configured to determine transmission power of a common control channel of the base station based on the status of the service area and the status of the total transmission power; and
    a transmission power setting unit configured to set the transmission power determined by the transmission power determination unit.

2. The base station as claimed in claim 1, the base station further comprising:
    an interference amount measurement unit configured to measure an uplink interference amount based on the received signals from the mobile stations; and
    a line status determination unit configured to determine line status of the base station based on the uplink interference amount and transmission power in the surrounding base stations;
    wherein the transmission power determination unit determines the transmission power of the common control channel of the base station based on the line status.

3. The base station as claimed in claim 2, the base station further comprising a wireless resource exchanging unit configured to exchange at least one of the status of the service area, the total transmission power, the uplink interference amount and the transmission power with a surrounding base station that forms an adjacent cell adjacent to a cell formed by the base station.

4. The base station as claimed in any one of claims 1-3, wherein the service area status determination unit accumulates received quality of the received signals to obtain a cumulative value and determines the status of the service area of the base station based on comparison between the cumulative value and a predetermined reference value of received quality.

5. The base station as claimed in any one of claims 1-3, wherein the total transmission power determination unit determines the status of the total transmission power of the base station based on an average of total transmission power values of the surrounding base stations.

6. The base station as claimed in claim 2, wherein the line status determination unit determines the line status of the base station based on a sum of the uplink interference amount and the transmission power in the surrounding base stations.

7. The base station as claimed in any one of claims 1-3, wherein the transmission power determination unit increases the transmission power of the common control channel when the status of the total transmission power of the base station is less than a predetermined threshold.

8. A transmission power control method for use in a base station, the transmission power control method comprising:
    a receiving step of receiving signals from a plurality of mobile stations;
    a service area status determination step of determining status of a service area of the base station based on the received signals from the mobile stations;
    a total transmission power determination step of determining status of total transmission power of the base station based on total transmission power of surrounding base stations;
    a transmission power determination step of determining transmission power of a common control channel of the base station based on the status of the service area and the status of the total transmission power; and
    a transmission power setting step of setting the transmission power determined in the transmission power determination step.

9. The transmission power control method as claimed in claim 8, the transmission power control method further comprising:
    an interference amount measurement step of measuring an uplink interference amount based on the received signals from the mobile stations;
    a receiving step of receiving the uplink interference amount and transmission power in the surrounding base stations; and
    a line status determination step of determining line status of the base station based on the uplink interference amount and the transmission power in the surrounding base stations;
    wherein, in the transmission power determination step, the base station determines the transmission power of the common control channel of the base station based on the line status.

* * * * *